(12) United States Patent
Scarano et al.

(10) Patent No.: US 7,076,427 B2
(45) Date of Patent: Jul. 11, 2006

(54) METHODS AND APPARATUS FOR AUDIO DATA MONITORING AND EVALUATION USING SPEECH RECOGNITION

(75) Inventors: Robert Scarano, Monroe, CT (US); Lawrence Mark, Trumbull, CT (US)

(73) Assignee: SER Solutions, Inc., Dulles, VA (US)

( * ) Notice: Subject to any disclaimer, the term of this patent is extended or adjusted under 35 U.S.C. 154(b) by 0 days.

(21) Appl. No.: 10/687,702

(22) Filed: Oct. 20, 2003

(65) Prior Publication Data

US 2004/0117185 A1   Jun. 17, 2004

Related U.S. Application Data

(60) Provisional application No. 60/496,916, filed on Aug. 22, 2003, provisional application No. 60/419,737, filed on Oct. 18, 2002, provisional application No. 60/419,738, filed on Oct. 18, 2002.

(51) Int. Cl.
  *G10L 15/08* (2006.01)
  *H04M 3/22* (2006.01)
(52) U.S. Cl. .................. 704/270; 704/251; 379/265.06
(58) Field of Classification Search ................ 379/242, 379/265.02, 265.06; 704/231, 243, 245, 704/246, 251, 252, 253, 254, 270
See application file for complete search history.

(56) References Cited

U.S. PATENT DOCUMENTS

| 5,535,256 A | 7/1996 | Maloney et al. |
| 5,638,489 A | 6/1997 | Tsuboka |

(Continued)

FOREIGN PATENT DOCUMENTS

EP          0 833 498 A2      4/1998

OTHER PUBLICATIONS

Frakes et al., "Information Retrieval Data Structures & Algorithms", Prentice-Hall, 1992, ISBN 0-13-463837-9, pp. 264-268.

(Continued)

*Primary Examiner*—V. Paul Harper
(74) *Attorney, Agent, or Firm*—Fulbright & Jaworski LLP

(57) ABSTRACT

The present invention relates to audio data monitoring using speech recognition technology. In particular, the present invention uses business rules combined with unrestricted, natural speech recognition to monitor conversations in a customer interaction environment, literally transforming the spoken word to a retrievable data form. Implemented using the VorTecs Integration Platform (VIP), a flexible Computer Telephony Integration base, the present invention enhances quality monitoring by effectively evaluating conversations and initiating actionable events while observing for script adherence, compliance and/or order validation.

70 Claims, 19 Drawing Sheets

U.S. PATENT DOCUMENTS

| | | | |
|---|---|---|---|
| 5,884,259 | A | 3/1999 | Bahl et al. |
| 6,061,652 | A | 5/2000 | Tsuboka et al. |
| 6,185,527 | B1 | 2/2001 | Petkovic et al. |
| 6,263,049 | B1 | 7/2001 | Kuhn |
| 6,408,064 | B1 | 6/2002 | Fedorov et al. |
| 6,408,270 | B1 | 6/2002 | Garber |
| 6,434,520 | B1 * | 8/2002 | Kanevsky et al. .......... 704/243 |
| 6,542,602 | B1 | 4/2003 | Elazar |
| 6,603,854 | B1 | 8/2003 | Judkins et al. |
| 2001/0040942 | A1 | 11/2001 | Glowny et al. |
| 2001/0049601 | A1 | 12/2001 | Kroeker et al. |
| 2002/0051522 | A1 | 5/2002 | Merrow et al. |
| 2002/0147592 | A1 | 10/2002 | Wilmot et al. |
| 2002/0156776 | A1 | 10/2002 | Davallou |

OTHER PUBLICATIONS

Clements et al., "Phonetic Searching of Digital Audio", Fast-Talk Communications, Inc. [retrieved Aug. 4, 2002]. Retreived from the Internet: <http://web.archive.org/we/*/www.fast-atlk.com/technology_how.html>, pp. 1-10.

"VorTecs Uses Fast-Talk to Power Intelligent Communication Solutions" pp. 1-3.

Geoffrey Giordano, "Integrating a Call Logger Into the Modern Contact Center", Dec. 3, 2001, pp. 1-6.

Jeffrey Kindon, "Computer Telephony Integration", Nov. 28, 2001, pp. 1-7.

* cited by examiner

FIG. 6

SpotIT! Page 2 of 4
Call Detail Report
10/13/2002

| Channel | Calls | Stats | Total | Score |
|---------|-------|-------|-------|-------|
| 4121    | ?     | 11    | 28    | 36    |

Call ID  Start Time              End Time
500001   5/7/2002 4:10:50PM      5/7/2002 4:12:00PM

| Statistic | Score |
|---|---|
| Proper Opening | 1 |
| DOB/Confirm 21 | 1 |
| Where get numb | 0 |
| Name | 1 |
| Address | 1 |
| Telephone | 0 |
| Future Contact | 1 |
| Verify Info | 1 |
| Appropriate Hold | 0 |
| Conduct Survey | 0 |
| Thank Customer | 1 |

Call ID  Start Time              End Time
500030   5/7/2002 4:10:50PM      5/7/2002 4:12:00PM

| Statistic | Score |
|---|---|
| Proper Opening | 1 |
| DOB/Confirm 21 | 1 |
| Where get numb | 0 |
| Name | 0 |
| Address | 0 |
| Telephone | 0 |
| Future Contact | 0 |
| Verify Info | 0 |
| Appropriate Hold | 0 |
| Conduct Survey | 0 |
| Thank Customer | 0 |

Call ID  Start Time              End Time
500031   5/7/2002 4:10:50PM      5/7/2002 4:12:00PM

| Statistic | Score |
|---|---|
| Proper Opening | 1 |
| DOB/Confirm 21 | 1 |
| Where get numb | 0 |
| Name | 0 |
| Address | 0 |
| Telephone | 0 |
| Future Contact | 0 |
| Verify Info | 0 |
| Appropriate Hold | 0 |
| Conduct Survey | 0 |
| Thank Customer | 0 |

*FIG. 17*

METHODS AND APPARATUS FOR AUDIO DATA MONITORING AND EVALUATION USING SPEECH RECOGNITION

CROSS-REFERENCE TO RELATED APPLICATIONS

The present application is a continuation-in-part of U.S. Provisional Patent Application 60/419,737 filed Oct. 18, 2002 and is related to U.S. Provisional Patent Application 60/496,916 entitled System For And Method Of Automated Quality Monitoring filed Aug. 22, 2003 and 60/419,738 entitled Methods and Apparatus for Audio Data Analysis and Data Mining Using Speech Recognition filed Oct. 18, 2002, and the Continuation-in-Part application Ser. No. 10/687,703 of the latter by the same title and filed contemporaneously herewith, all of which are incorporated herein by reference in their entireties.

BACKGROUND OF THE INVENTION

1. Field of the Invention

The present invention relates to the field of audio data monitoring, such as the monitoring of telephone calls and, more specifically, to leveraging voice recognition technology to provide new and improved features and functionality for use in audio data monitoring. Such new and improved features and functionality include user programmable rules-based quality monitoring of telephone calls, speech and data SQL integration for fast and efficient searches of audio data for spoken words, phrases, or sequences of words, the provision of speech cursors indicating the location of words or phrases in audio data, automated quality monitoring, as well as other features and functions described herein.

2. Description of Related Art

Prior art telephone call monitoring typically consisted of recording telephone calls and the manual monitoring of only a select few (e.g., 5%) of the recorded calls by a call center employee or supervisor. Searching for particular words or phrases must be performed manually by listening to segments of audio recordings. Such manual call monitoring is tedious, time consuming, laborious, and costly.

Call monitoring is often included as part of modern call or contact center supported by modern Computer Telephony Integration (CTI) systems. CTI is an indispensable component of doing business over the telephone, CTI middleware providing a software bridge between computers and telephone systems in contact centers. CTI functions to bringing together computer systems and telephone systems so that their functions can be coordinated. Functionality made possible by core CTI technology include: Interactive Voice Response (IVR) integration, which transfers caller-entered IVR information to Customer Support Representative (CSR) desktop PCs, Screen Pop and coordinated call-data transfer between CSRs. By integrating computers and telephone systems, contact centers can realize significant advances in both CSR productivity and the quality of customer service.

CTI applies computer-based intelligence to telecommunications devices, blending the functionality of computers and computer networks with the features and capabilities of sophisticated telephone systems over an intelligent data link to gain increases in CSR productivity, customer satisfaction and enterprise cost savings. CTI combines the functionality of programmable computing devices with the telephony network through the exchange of signaling and messaging data between the switching systems and a computer. CTI's principal undertaking is to integrate various call center systems and platforms, including PBXs, LANs, IVR/VRU systems, predictive dialers, the desktop PC and Internet-based applications.

Three functions—IVR integration, screen pop and coordinated call-data—transfer lie at the core of most CTI implementations. A common CTI function is the "screen pop" or "smart call handling". The screen pop uses telephony-supplied data typically ANI (automatic number identification), DNIS (dialed number identification service) and/or IVR-entered data to automatically populate a CSR's desktop application screen with information related to the transaction, such as a customer's profile or account information, scripts or product information. When the CSR answers the phone, he or she knows who is calling and is better positioned to provide effective customer service. Closely related to the screen pop application is an application often referred to as "coordinated call-data transfer." A typical scenario for this application might proceed as follows. A Tier 1 CSR receives a customer call. The Tier 1 CSR realizes that the customer will have to be transferred to a Tier 2 CSR to satisfy the customer inquiry. With a few clicks of the mouse, coordinated call-data transfer functionality allows the transferring CSR to send both the call and the updated screen data to the receiving CSR. With all of the information relating to the first transaction, the receiving CSR has more data and is able to more efficiently and effectively conduct the next customer interaction.

IVR integration typically rounds out most basic CTI implementations. With IVR integration, information a customer enters into an IVR system is automatically displayed on a CSR's desktop PC when the customer elects to speak directly to a CSR. At the same time, information collected by the IVR system can be used to trigger a screen pop. With this functionality, customers are relieved from having to repeat basic information when transferring to a live CSR. The customer is able to carry on with the live CSR where he or she left off with the IVR system.

CTI functionality has four principal benefits including (i) increased CSR productivity; (ii) more competent customer service; (iii) faster access to customer information; and (iv) long distance cost savings. With CTI, CSR productivity increases significantly. CSRs are relieved from having to ask customers for routine information or for information the customer has already provided, either to another CSR or to another call center device. Time spent keying in database access information and waiting for resulting information is eliminated. With these process improvements, the overall call processing time is reduced, allowing CSRs to process more calls more efficiently in the course of a typical day. With screen pop functionality alone, the typical call center should be able to realize a 10 to 15 second reduction in average call processing times. The screen pop functionality offers a significant savings to a contact center when implementing "core" CTI functionality. When there are frequent transfers of customer's calls, either from an IVR system or between CSRs, the reduction in average call processing times can be even greater.

Another benefit of CTI is the ability to deliver more competent customer service. With core CTI functionality, customers are recognized by name as soon as they reach a live CSR. In addition, customers are relieved from having to repeat routine information every time they are transferred to a different call center location. To the customer, CTI is transparent, as it provides the customer with a seamless interaction, and giving the customer a favorable impression of the organization as a competent, customer-focused operation.

CTI further supports upselling and cross-selling existing customers. Having fast access to customer information is a critical requirement to being able to upsell and cross-sell effectively. By allowing CSRs to access customer information as they make voice contact with the customer, CSRs are better able to plan up-sale and cross-sale proposals.

An additional benefit of CTI is reduced long distance charges per call. CTI allows the call center to process calls faster, the technology can result in considerable reductions of long distance charges.

With reference to FIG. 1, a typical call or Contact Center 100 may include a switch 102 such as an Automatic Call Distributor (ACD) and/or Private Branch Exchange (PBX) connected to a communications network, such as the Public Switched Telephone Network (PSTN) for receiving calls from and making calls to customer telephones 101. Switch 102 is connected to and cooperates with Interactive Voice Response system 103 for automatically handling calls (e.g., playing messages to and obtaining information from callers, etc.) and with CTI Server 104 for routing calls to CSRs. CTI Server 104 is also connected to Switch 102 for receiving call information such as DNIS and ANI, and to CSR Workstation 105 for providing information to a CSR. CSR Workstation 105 may connect to Database 106 directly and/or receive information form Database 106 through CTI Server 104 when an appropriate connection (not shown) is available. A CSR has access both to CSR Workstation 105 and to CSR Telephone 107 for conversing with customers and retrieving data from and inputting data into Database 106 and performing other call handling actions using CTI Server 104, IVR 103 and Switch 102.

Referring to FIG. 1, a typical call processing session may proceed as follows.

1.) A customer call from telephone 101 comes into ACD/PBX switch 102.
2.) The call gets routed to IVR 103.
2a). Switch 102 sends ANI, DNIS to CTI Server 104.
3.) IVR 103 requests call data from CTI Server 104.
3a.) The call data is sent to IVR 103 from CTI Server 104.
4.) IVR 103 and Caller exchange information.
5.) IVR 103 sends call data to the CTI Server 104.
5a.) IVR 103 transfers the call back to Switch 102.
6.) CSR Workstation 105 requests data and the CTI Server 104 sends it.
7.) Data sent to CSR Workstation 105 triggers a call to Customer Database 106.
8.) The data from the caller data triggers a call to the Customer Database 106 to populate the CSR Screen 105 with the customer data as the voice arrives.

One of the tasks in running a call or Contact Center is to ensure that the system is properly operating and that each CSR is trained and efficiently handles interactions with customers. Such quality assurance tasks are often supported by call monitoring systems and methods. For example, U.S. Pat. No. 5,535,256 entitled Method And System For Automatically Monitoring The Performance Quality Of Call Center Service Representatives issued Jul. 9, 1996 to Maloney et al. describing a method and system for monitoring the performance of a CSR in servicing calls in a call center by determining an interval within which to monitor the service representative's performance in responding to calls, as well as by determining a number of calls or length of time for monitoring the representative within the interval. U.S. Pat. No. 6,263,049 entitled Non-Random Call Center Supervisory Method and Apparatus issued Jul. 17, 2001 to Kuhn describing a computer-implemented method and apparatus for monitoring of CSR calls in a non-random fashion in order to provide a supervisor with flexible control over monitoring schedules. U.S. Pat. No. 6,408,064 entitled Method and Apparatus for Enabling Full Interactive Monitoring of Calls To and From a Call-In Center issued Jun. 18, 2002 to Fedorov et al., describing a CSR station at a telephone call center with a telephone speaker line connected to a microphone input at the sound card. These CSR stations are interconnected on a LAN such that a supervisor at one station may monitor telephone conversations at another station. U.S. Pat. No. 6,542,602 entitled Telephone Call Monitoring System issued Apr. 1, 2003 to Elazar describing a method of monitoring CSR telephonic interactions with customers including a) receiving a CTI datum associated with a telephone call between a CSR and a party, b) determining whether the telephone call is to be recorded by determining whether the CTI datum meets at least one predefined monitoring condition, and, if so, c) recording at least a portion of the telephone call.

While these prior art systems provide some degree of CSR monitoring and system quality assurance, improved methods and systems are needed to enhance monitoring functions, collect information, and support review and analysis of quality assurance and monitoring data.

BRIEF SUMMARY OF THE INVENTION

According to one aspect of the invention, a method of analyzing audio data includes steps of processing an audio segment into a format suitable for rapid searching; determining an appropriate set of rules to apply to the audio segment; and searching the audio segment in accordance with the rules.

According to a feature of the invention, the method may include a step of referencing the audio segment wherein the audio segment has been previously stored in an electronic media or a step of recording the audio segment.

According to another feature of the invention, the step of processing may include processing the audio segment into a format suitable for rapid phonetic searching.

According to another feature of the invention, the step of processing may include a step of identifying symbols corresponding to discrete portions of the audio segment, which symbols may represent respective phonemes of a set of phonemes characteristic of speech.

According to another feature of the invention, the step of searching may include the steps of: attempting to find a match within the audio segment of a target phrase; and in response, determining whether the target phrase is present within the audio segment. at or above a specified confidence level. A step of triggering an event may occur in response to the step of determining.

According to another feature of the invention, a step of triggering an event as a result of the searching step resulting in matching a given phrase at or above a specified confidence level and/or in not finding a match for a given phrase at or above a specified confidence level. Alternatively or in addition to triggering an event, detection of either condition may result in incrementing a statistical parameter.

According to another feature of the invention, searching may include a combination present (or absent) in a specified order and/or temporal relationship (with respect to each other and/or within the audio segment) within the audio segment.

According to another feature of the invention, a method may further include analyzing CTI data associated with the audio segment; and providing an indication of satisfaction of a criteria in response to the steps of searching and analyzing.

The CTI data may include (i) called number (DNIS), (ii) calling number (ANI) and/or (iii) Agent Id (a unique identifier of the agent that handled the call) According to another feature of the invention, the method may further include a step of performing order validation. Order validation may include comparing a parameter of an order associated with the audio segment with a content of the audio segment resulting from the searching step.

According to another feature of the invention, the step of searching may include a step of searching for a target phrase, the method further comprising a step of performing order validation including determining whether an order associated with the audio segment is consistent with a result of the step of searching for the target phrase. A step of entering data for the order may also be included wherein the step of performing order validation includes validating whether the data is reflected within the audio segment.

According to another aspect of the invention, a method of processing audio data may include the steps of importing call data; selectively, responsive to the call data, analyzing an audio segment associated with the call data, the step of analyzing including processing the audio segment into a format suitable for rapid searching; determining an appropriate set of rules to apply to the audio segment; and searching the audio segment in accordance with the rules.

According to another aspect of the invention, a system for analyzing audio data may include an audio processor operable to process an audio segment into a format suitable for rapid searching; logic operable to determine an appropriate set of rules to apply to the audio segment; and a search engine operable to search the audio segment in accordance with the rules. The system may further include an electronic media having stored therein the audio segment and circuitry for retrieving the audio segment from the memory and providing the audio segment to the audio processor.

According to a feature of the invention, the system may further include an audio recorder operable to store the audio segment.

According to another feature of the invention, the audio processor may be operable to process the audio segment into a format suitable for rapid phonetic searching and the search engine is operable to search the audio segment for phonetic information.

According to another feature of the invention, the search engine may be operable to identify symbols corresponding to discrete portions of the audio segment. The symbols may represent respective phonemes of a set of phonemes characteristic of speech.

BRIEF DESCRIPTION OF THE SEVERAL VIEWS OF THE DRAWINGS

Figure 6:
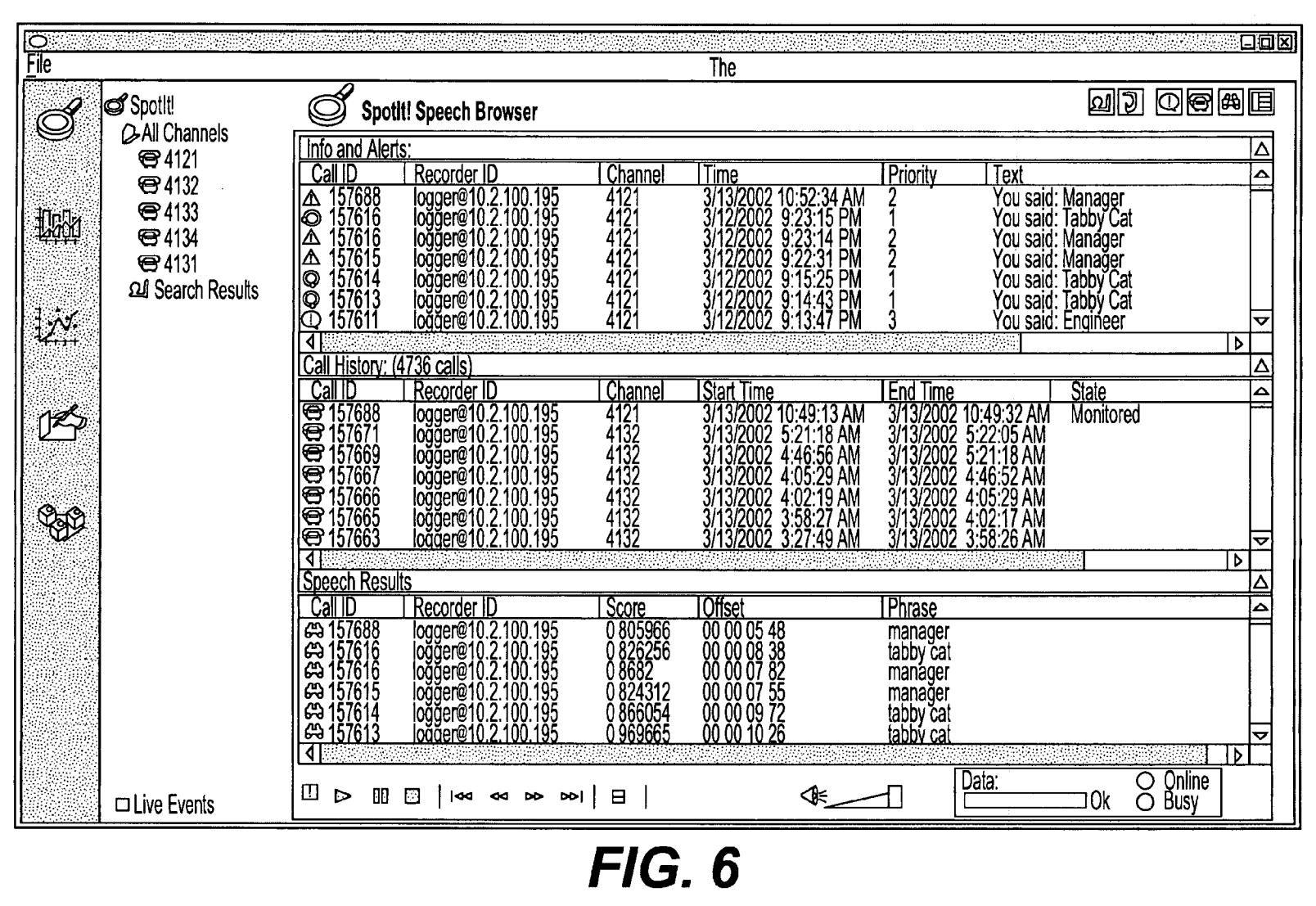

FIG. 6 is a screen shot of a workstation display depicting a speech browser main display used to browse and filter calls, playback audio, search for and retrieve audio associated with calls, and implement speech-processing of audio;

FIG. 17 is a screen shot of a workstation display depicting a sample report generated by the system including speech-related statistics;

DETAILED DESCRIPTION OF THE INVENTION

Figure 1:
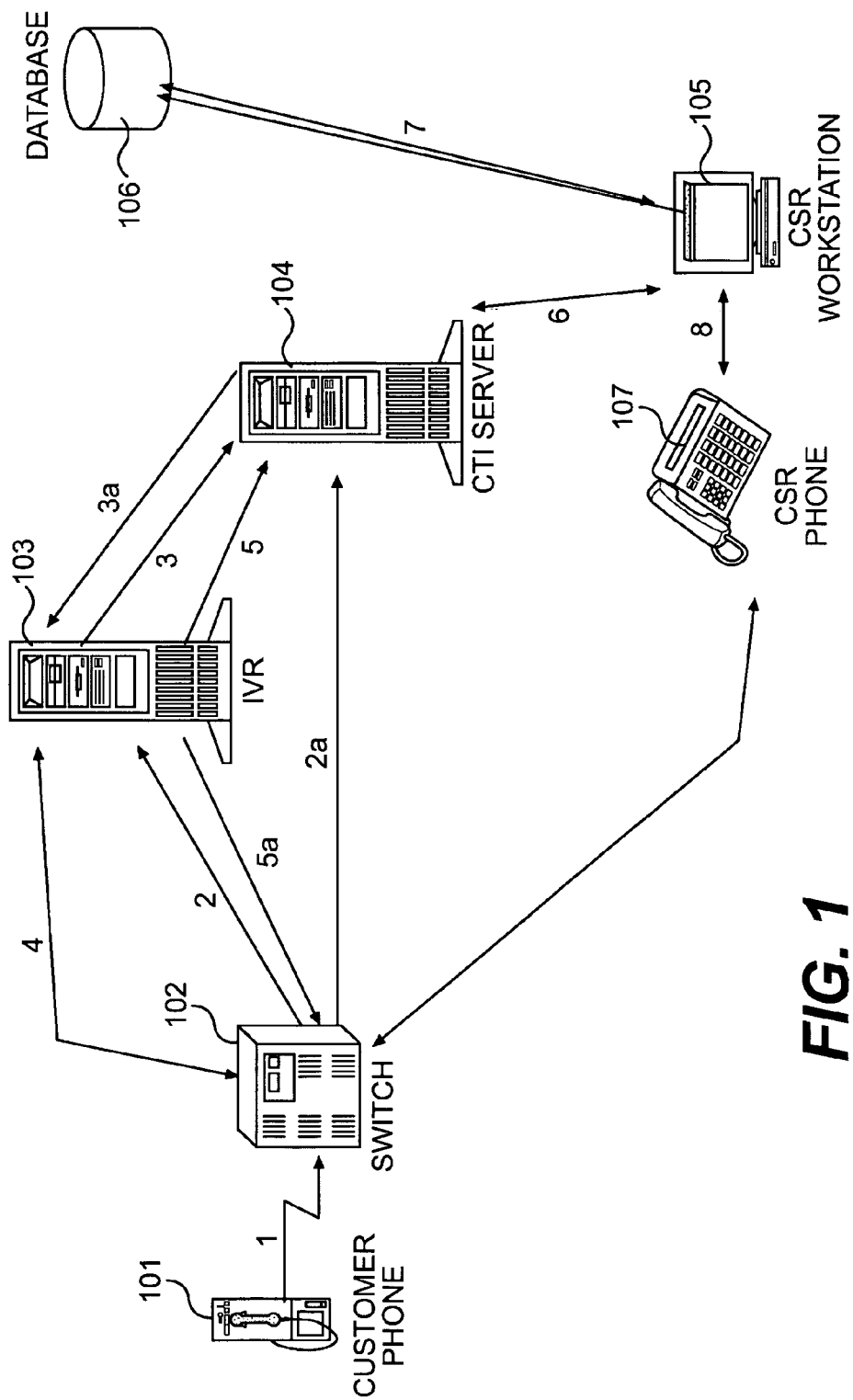
FIG. 1 is a diagram of a Contact Center.

The ensuing description provides exemplary embodiments only, and is not intended to limit the scope, applicability, or configuration of the invention. Rather, the ensuing description of the exemplary embodiments will provide those skilled in the art with an enabling description for implementing an example embodiment of the invention. It should be understood that various changes may be made in the function and arrangement of elements without departing from the spirit and scope of the invention.

To address the shortcomings of prior art systems, it would be advantageous to provide an automated call monitoring system capable of automatically analyzing all telephone calls as they are recorded, which is also capable of reviewing and monitoring previously recorded calls. It would be further advantageous to be able to easily search for spoken words, phrases or word sequences in the recorded audio using speech recognition technology.

In a modern contact center, there is more to voice logging than just recording audio. There are many reasons why a contact center has a voice, or call, logger: liability, training, and quality are some examples. To be useful, logged conversations must be located by some reasonable criteria in a timely manner.

In a typical situation, a contact center manager may receive a call from a caller who may be dissatisfied with service provided by a CSR during a recent call. To investigate the issue, the contact center manager may ask for the caller's name, time and date of the call, and the name of the agent they spoke to. Using prior technology, the task of locating the call recording in any voice logger if formidable. Although it may be approximately known when the caller called (or at least when they think they called, given time zone differences), it may be difficult to identify the CSR handling the call. Thus, the manager must search for the recording, knowing that it will take hours to locate the right one, and that the correct recording may never be found. This search problem is exacerbated in many situations in which there is a free seating environment for the CSRs such that, even knowing who the agent was and which campaign the call came in on, it will be of little help, because there is no way to link the voice data with the caller's record. Thus, it is desirable to reduce the number of records to be searched to a manageable subset. Ideally, the desired record(s) can be located in seconds with a simple, single search command. These goals and objectives are satisfied according to the various embodiments of the invention.

A voice logger according to one embodiment of the invention is more than a simple tape recorder, with sufficient data recordings that can be quickly located and played back. To obtain the necessary data, the voice logger may be integrated into a contact center's infrastructure, preferably to the ACD/PBX switch. For more complex searching, the voice logger may be integrated with the IVR and CSR workstation software.

One arrangement to integrate a call logger is to merge data from the billing output of the switch (SMDR) into the logged call records. Generally, the SMDR (The term SMDR is used generically to encompass all billing outputs) output of a switch contains the time/day of the call, the phone number of the party in the PSTN, the extension of the party on the switch, and the involved trunk ID. An advantage to SMDR integration is its relative ease of implementation and low cost. Many commercially available switches include a SMDR port by default. The SMDR port is usually an RS232 port that outputs billing records at the completion of calls. There may be a number of disadvantages to the use of SMDR. For example, the SMDR port may already be in use by the billing system such that, to share the data, an RS232 splitter device may be employed.

The amount of data available in the SMDR record, though sufficient for billing, may not be sufficient for narrowing searches. For example, CSR ID may not be included as an output field such that, in a free seating environment, it may be difficult to directly identify and locate calls for a particular CSR. Further, recorded call segments that span conferences and transfers may be difficult to accurately be accounted for. Another problem sometimes encountered is caused by systems using some form of proprietary fixed data format. In such cases, it may be difficult to obtain assistance from the switch manufacturers to update its SMDR format to accommodate advanced voice logging features. Note also that the call logger and the switch must agree, to the second, on the current time; clock drift will interfere with the logger's ability to merge data and that data from other sources, such as an agent's desktop or from an IVR may be difficult or impossible to integrate.

Some advanced features of an embodiment of the present invention rely on a Computer Telephony Integration (CTI) approach. CTI is used here as a generic term to describe a computer system that operates as an adjunct to the ACD/PBX. The adjunct system receives a stream of call related event messages for processing. Additionally, CTI can include the use of CTI middleware. Commercially available ACD/PBX switches typically include such CTI capability. An advantage to the use of CTI is that almost any available data can be collected and stored with the recording. In its simplest form DNIS, ANI/CLID, collected digits, and agent ID can be obtained and stored. Additionally, more complicated integrations can be performed. CSR entered data, data from a CRM system, and data from an IVR can be collected and attached to recordings. Contacts that span multiple agents can be retrieved together. PBX/ACD features such as free seating are easily accommodated. As new sources of data become available, they can be integrated into the CTI solution.

A CTI based system according to embodiments of the invention is not dependent on the clock settings of the switch. The CTI system receives the event messages in real-time and records the data in the call logger as the data becomes available. If there is no current CTI solution in a center, many of the other benefits of CTI (such as screen pop and cradle to grave reporting) can be realized at the same time. That is, the installed system becomes a base upon which other advanced contact center features can be built and provide for more efficient operations. To retrieve call related data, a supervisor simply asks the caller for their account number (or for any other data used to uniquely identify callers) and executes a search in the call logging system. The supervisor is quickly given access to the call recording and can evaluate and handle the situation. There typically is no need to call the customer back, nor is there a need to spend countless hours searching for the necessary recording. In addition to CTI data, which is optional, audio segments always have intrinsic data such as the start and end time of the call and the recording channel which captured the call.

Thus, embodiments of the present invention include audio data monitoring using speech recognition technology and business rules combined with unrestricted, natural speech recognition to monitor conversations in a customer interaction environment, literally transforming the spoken word to a retrievable data form. Implemented using, for example, the VorTecs Integration Platform (VIP), a flexible Computer Telephony Integration base, embodiments of the present invention enhance quality monitoring by effectively evaluating conversations and initiating actionable events while observing for script adherence, compliance and/or order validation. (SER Solutions, Inc. is the successor in interest to VorTecs, Inc., and provided improved systems, Sertify providing a feature rich embodiment of the SpotIt! system by VorTecs, and Sertify-Mining providing enhanced features to the MineIt! product.)

Embodiments of the present invention use programming language to instruct a computer to search audio data, such as a recorded telephone conversation, and take certain actions as a result of detecting or not detecting desired spoken words, phrases, or sequences of words. A command set may be used to enable the search that includes, but is not limited to Said, SaidNext, SaidPrev, and Search. A set of objects may be used for manipulating search results, including but not limited to SpeechResults (an enumerator), and SpeechResult (physical results of search).

Using such commands, the embodiments of the present invention can enable searches for sequences of spoken words, rather than just words or phrases. In other words, the present invention can either locate a particular word (e.g., Said<supervisor>), a phrase (e.g., Said<talk to your supervisor>), or a sequence (e.g., Said<talk>; SaidNext<supervisor>; SaidNext<complaint>), where the words in the sequence are not necessarily adjacent.

A virtual index may also be provided that points to time offsets within a voice communication. For example, when searching for a sequence of words, a speech cursor may be automatically advanced to the time offset when a word or phrase in the sequence is searched for and located. Subsequent searches for subsequent words within the sequence can then continue, leaving off from the location of the previous search as indicated by the speech cursor. Speech cursors may also be used to place a constraint on the portion of the audio data that is to be searched. For example, a speech cursor may be advanced to 15 seconds before the end of a call to monitor whether the agent says "thank you" at the end of the call.

Embodiments of the present invention significantly decrease the amount of manual involvement that is required for monitoring agent activity. It provides a facility to actively monitor for script adherence by scoring key performance indicators, ensures compliance by identifying required statements are made in the context of the conversation and through order validation by lifting entered data from an order, creating a variable rule and comparing the entered data to a structured confirmation. Of equal importance is the ability to identify required words or phrases that were omitted in an interaction with a customer.

Flexible rule implementation provides the ability to define, create, track, act on, and report monitored results. The need for an actionable event can be determined, and based on what is detected, pre-defined procedures can be automatically launched, such as raising alerts and queuing interactive processes such as outbound calls, follow-ups or the gathering and presentation of statistical feedback and reports. Embodiments of the present invention examine both sides of every call, and using customer-defined business rules, reduces speech to data in a fraction of the time it takes the actual conversation to occur and combines it with traditional data forms to administer monitoring sessions by scoring agents, determining compliance and identifying the most important calls for further examination. Performance statistics may be delivered to the agent desktop, which provides near real time self evaluation and motivation. By correlating agent dialogues with existing Computer Telephony Integration (CTI) and Customer Relationship Management (CRM) systems data, call center managers can electronically assess agent script adherence, determine regulatory compliance, perform order validation and potentially eliminate third party verification costs. In addition, marketing information can be gathered by mining the audio data to test the effectiveness of campaigns, and evaluate product, price and promotion strategies.

Embodiments of the present invention provide the following features and functions:

Automates the quality monitoring process;
Reduces overhead costs and capital expenditures;
Uses speech technology to access data that was not accessible until now;
Offers a holistic view of contact center and agent activity from the supervisor console;
Provides a faster method of spotting trends in the contact center;
Includes the Quality Monitoring tool of the VorTecs Quality Performance Suite;
Provides customer database integration;
Generates statistics and graphical reports;
Enables audio content mining;
Trigger alerts based on user-defined key words and phrases;
Provides flexible rules editing;
Includes voice logger integration.

Embodiments of the present invention may be implemented using the following standards and technology:

XML
Microsoft™ VBA
ActiveX/COM
CTI
TCP/IP
Client-Server Architecture
Voice Over Internet Protocol (VOIP)

Embodiments of the present invention may integrate speech recognition software with audio recording equipment and CTI links. When CTI or recording events signal the end of a recording, the system executes business rules to determine if the contact should be monitored. The system sends the audio into a queue to be processed by call center employees. After the audio has been processed, the system executes business rules that analyze the recorded speech. The business rules enable searches for words or phrases, and take actions upon locating (or not locating) the words or phrases, such as collecting statistics, displaying alerts, and generating reports. The business rules are flexible and customizable, and support if/then/else handling, such as Microsoft's™ VBA.

Embodiments of the present invention are particularly applicable to financial services markets, outsourcers, insurance carriers, health services, correctional facilities, and any other market segments where telephone call monitoring is applicable. For example, the embodiments of the present invention may be modified to provide the following applications: compliance assurance (e.g., with a script or rules), order validation (e.g., to assure that a telephone order was properly entered into a computer system), marketing (e.g., gathering of customer data and opinions), quality control, security, evaluation, service level guarantees (e.g., to check whether an agent/operator says "thank you", "have a nice day", etc.), training, rewards and incentives, as well as other applications.

Figure 2:
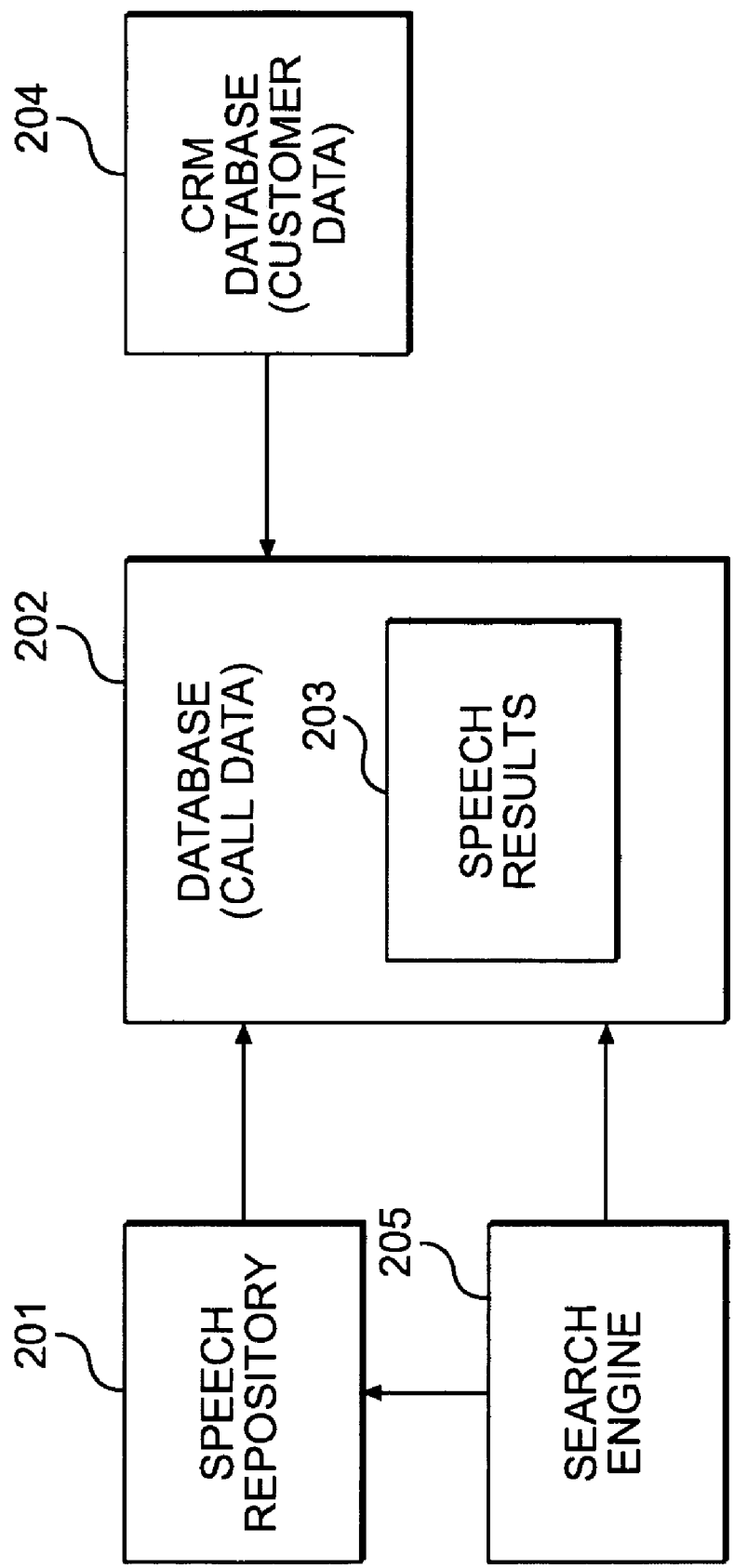
FIG. 2 is a block diagram of system for processing, storing and searching speech.

Embodiments of the present invention may be incorporated into and invoked as part of a CTI system. An embodiment of the present invention for the retrieval of audio data is exemplified by a product of VorTecs, Inc. known as "Spot It!" Spot It! may be used in connection with VorTecs, Inc.'s Mine It! Product, that latter incorporating features of embodiments of the invention which is the subject of the above-referenced concurrently filed application. SER Solutions, Inc., the successor in interest to VorTecs, Inc. provides improved systems including Sertify, a feature rich embodiment of SpotIt! and Sertify-Mining providing enhanced features to that of the MineIt! product. A block diagram of MineIt! Is present in FIG. 2.

Figure 3:
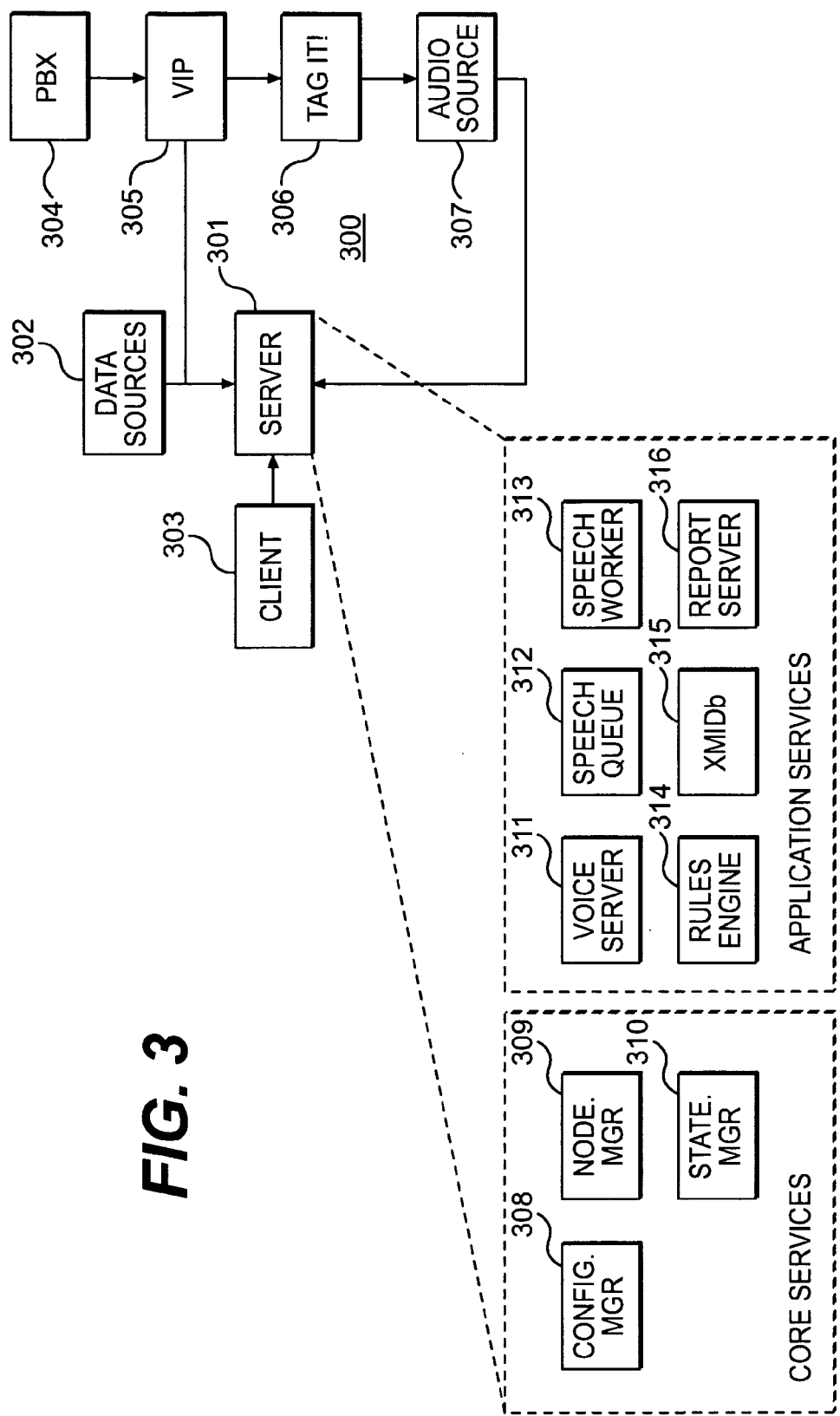
FIG. 3 is a block diagram of a computer integrated telephony (CTI) system incorporating audio processing according to an embodiment of the invention.

Sertify is a rules based call monitoring application embodying aspects and features of the present invention, being designed to be compatible with customer interaction infrastructures that listens to calls and automatically executes actionable events based on the result. Sertify augments existing recording systems to provide a greater level of automation, enhanced operational flexibility, and a comprehensive electronic analysis of customer contacts including spoken word. A system configuration is shown in FIG. 3 including a Server 301 connected to and receiving data from Data Sources 302, Voice Information Processor (VIP) 305, and Audio Source 307. PBX 304 is connected to VIP 305 which, in turn, is connected to TagIT! 306 which, supplies its output to Audio Source 307. Server 301 includes both Core and Application Services, The Core Services include Configuration Manager 308, Node Manager 309 and State Manager 310. The Application Services include Voice Server 311, Speech Queue 312, Speech Worker 313, Rules Engine 314, Xml Database 315, and Report Server 316.

Figure 4:
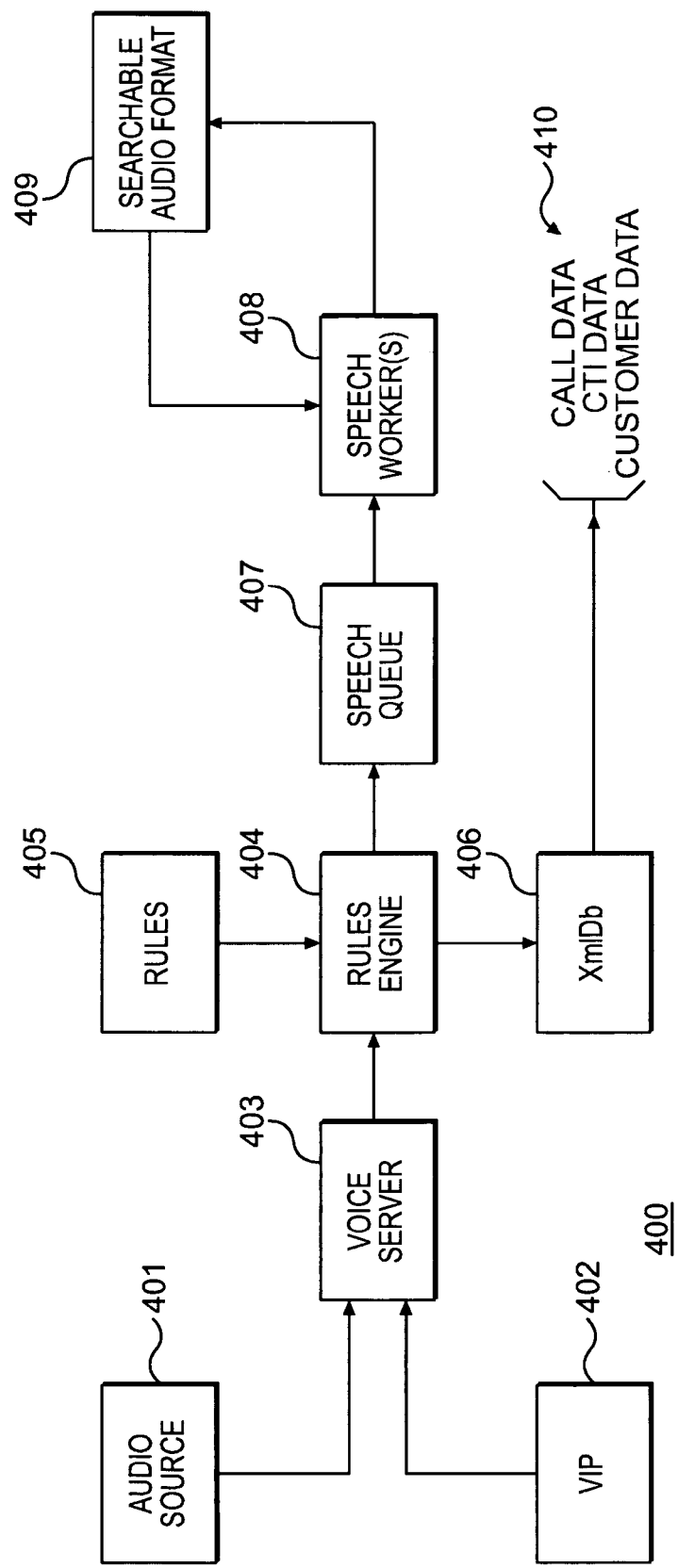
FIG. 4 is a dataflow diagram of the embodiment depicted in FIG. 3.

A dataflow for processing audio data is depicted in FIG. 4. As shown therein, audio from Audio Source 401 and VIP 402 are supplied to Voice Server 403. The combined audio files from Voice Server 403 are made available to Rules Engine 404 which applies one or more Rules 405 to selectively provide appropriate audio segments to Xml Database 406 and Speech Queue 407. Xml Database 406 associates the audio segments with Call Data, CTI Data and Customer 410. Speech Queue 407 makes the audio segments available to Speech Worker(s) 408 which processes the audio segments to provide Searchable Audio Format 409. The searchable format may convert the audio into a series of symbols, such as phonemes, that represent the speech and can be searched and otherwise handled as discrete data. Examples of word spotting and phonetic searching are described in U.S. Pat. No. 6,408,270 entitled Phonetic Sorting And Searching issued Jun. 18, 2002 to Garber; U.S. Pat. No. 6,061,652. entitled Speech Recognition Apparatus issued May 9, 2000 to Tsuboka, et al.; U.S. Pat. No. 5,884,259 entitled Method And Apparatus For A Time-Synchronous Tree-Based Search Strategy issued Mar. 16, 1999 to Bahl, et al.; U.S. Patent Publication No. 20020147592 entitled Method And System For Searching Recorded Speech And Retrieving Relevant Segments of Wilmot et al. published Oct. 10, 2002; and No. 20010049601 entitled Phonetic Data Processing System And Method of Kroeker et al. published Dec. 6, 2001.

Figure 5:
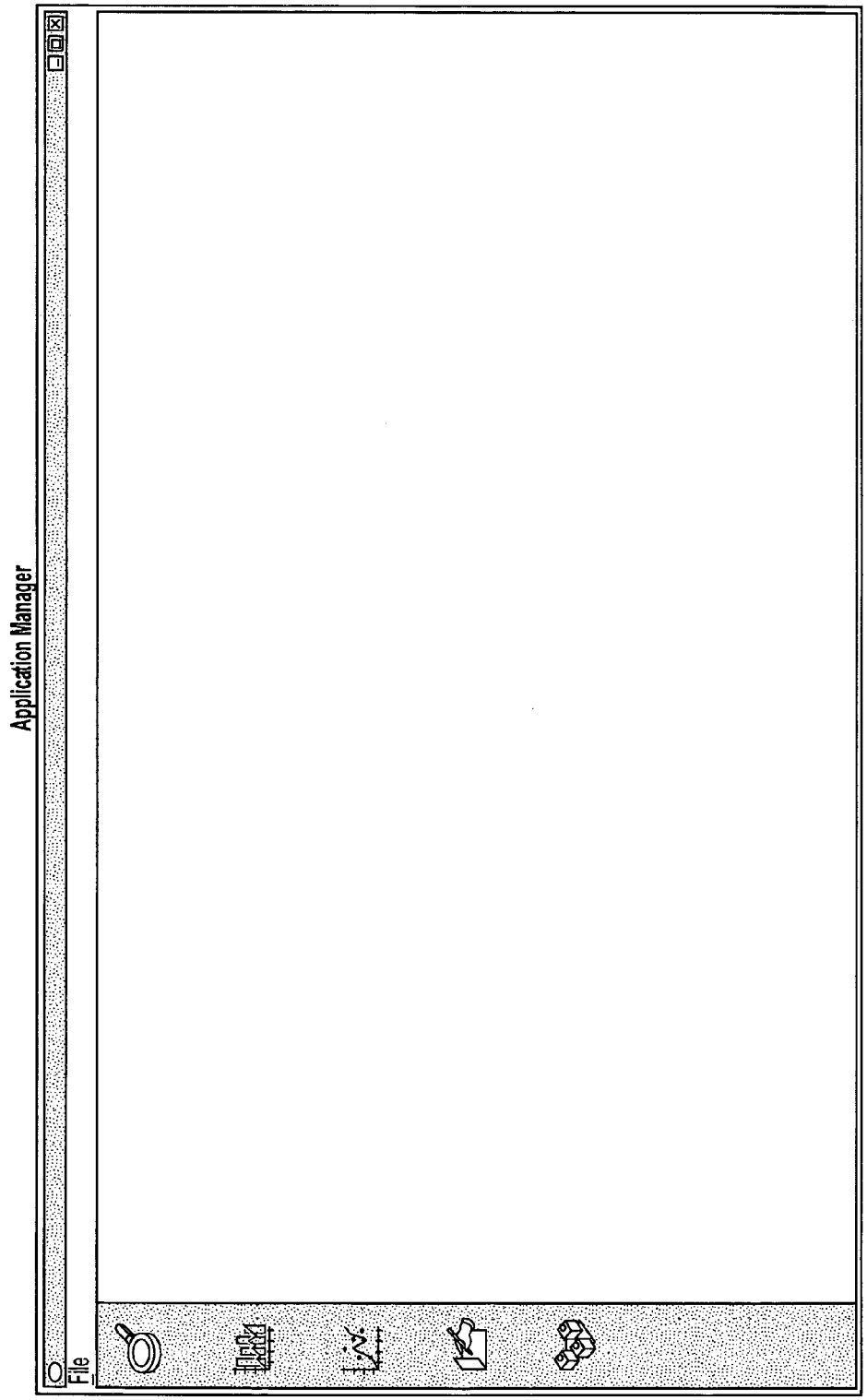
FIG. 5 is a screen shot of a workstation display depicting an application manager used to access CTI system components including systems and functionalities according to embodiments of the invention.

FIGS. 5–17 depict screen shots of a speech processing interface according to an embodiment of the present invention. Referring to FIG. 5, an initial screen of an application manager provides a single, integrated interface for accessing all components of a suite of programs including those providing for the capture of audio and data and mining of the captured data. FIG. 6 depicts a speech browser providing an interface for (i) browsing calls, (ii) filtering calls, (iii) audio playback and queuing to exact moments when phrases are detected, (iv) speech mining, and (v) speech-processor (batch processing). By selecting an item from any one viewport, all other may be configured to automatically filter their results to match the selection. For instance, if the user selects the station "4121" from the tree, Alerts, Call History, and Speech Results viewports will be constrained only to calls that were recorded for the selected station "4121". Furthermore, if the user then selects a specific call from the CallHistory viewport, then the Speech Results viewport may be configured to be constrained only to speech-results associated with the currently selected call. Toolbar buttons in the Speech Browser provide access to the Speech Mining and Speech-Processor functions (shown by themselves). All of the windows may be resizable to provide a familiar interface format.

Figure 7:
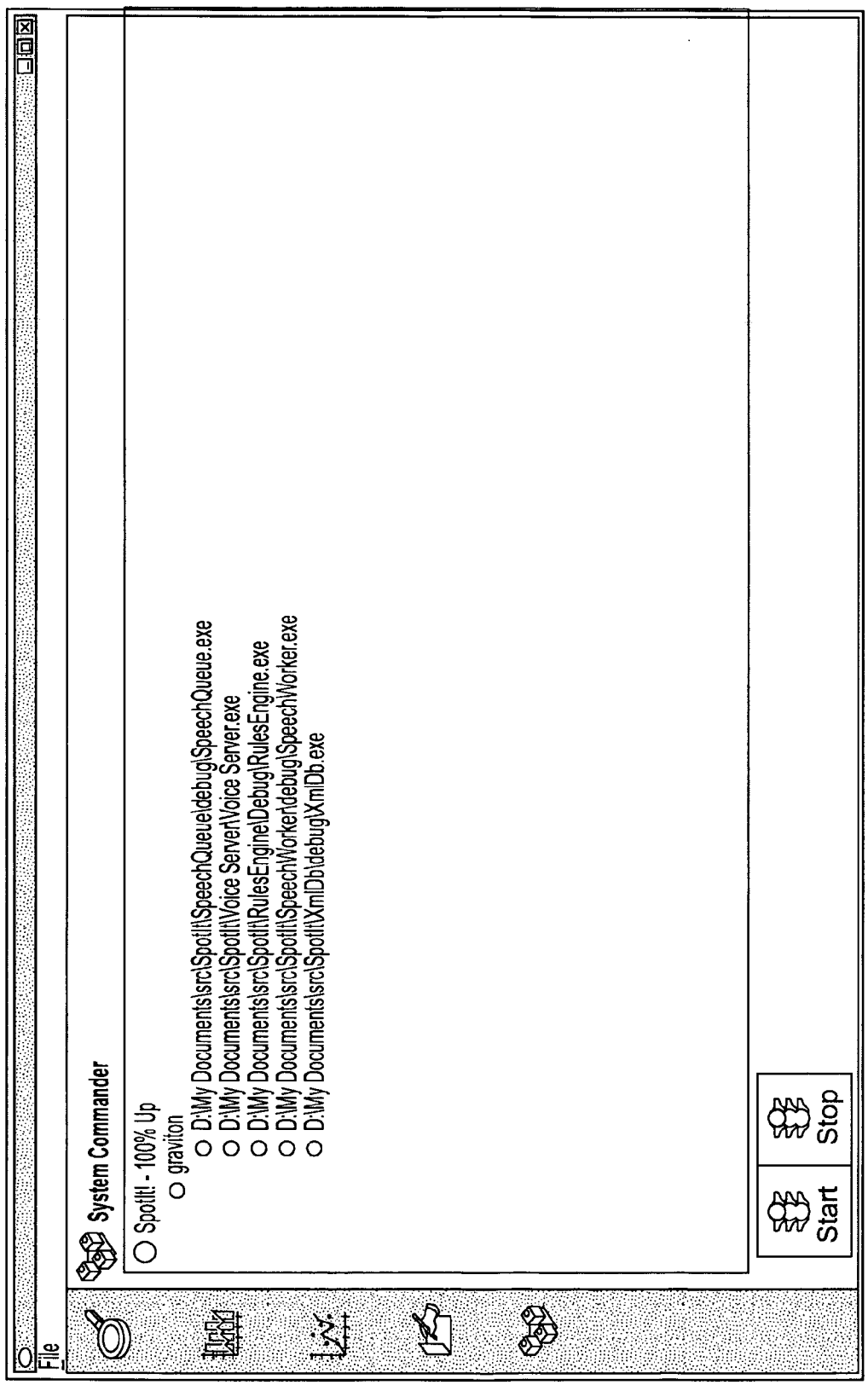
FIG. 7 is a screen shot of a workstation display depicting a system control or commander feature used to start and stop system operations and to provide system status information.
Figure 8:
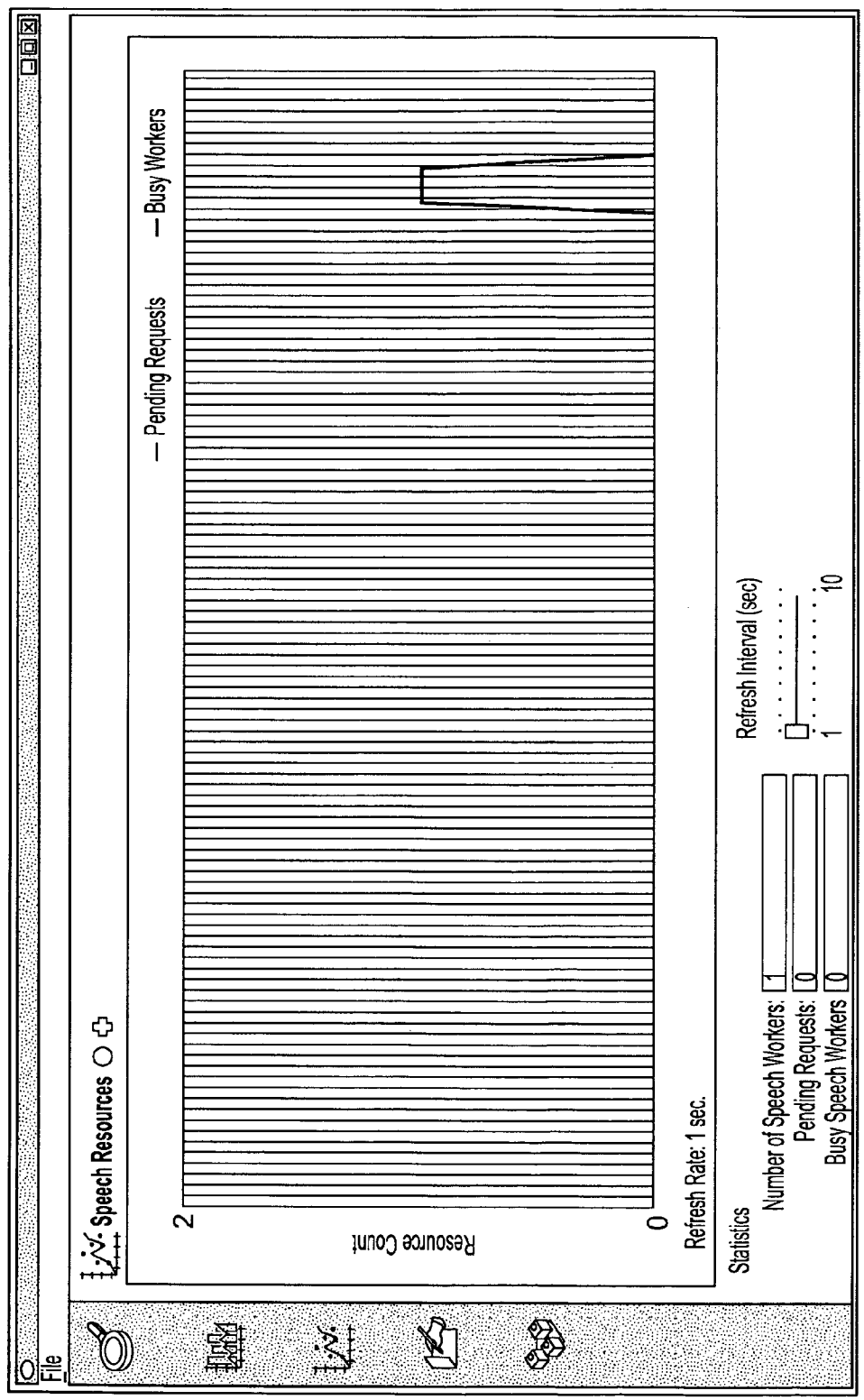
FIG. 8 is a screen shot of a workstation display depicting a speech resources feature used to display system utilization information.

FIG. 7 depicts a system control or system commander screen used to start and stop the systems, as well as provide system status information. Since the system may accommodate multiple servers, the system commander provides a single interface for starting, stopping, and viewing status across all servers. A speech resources component depicts in FIG. 8 displays current system utilization. It may be used to observe the rate of requests and how fast the system is keeping up with the requests, together with other system information.

Figure 9:
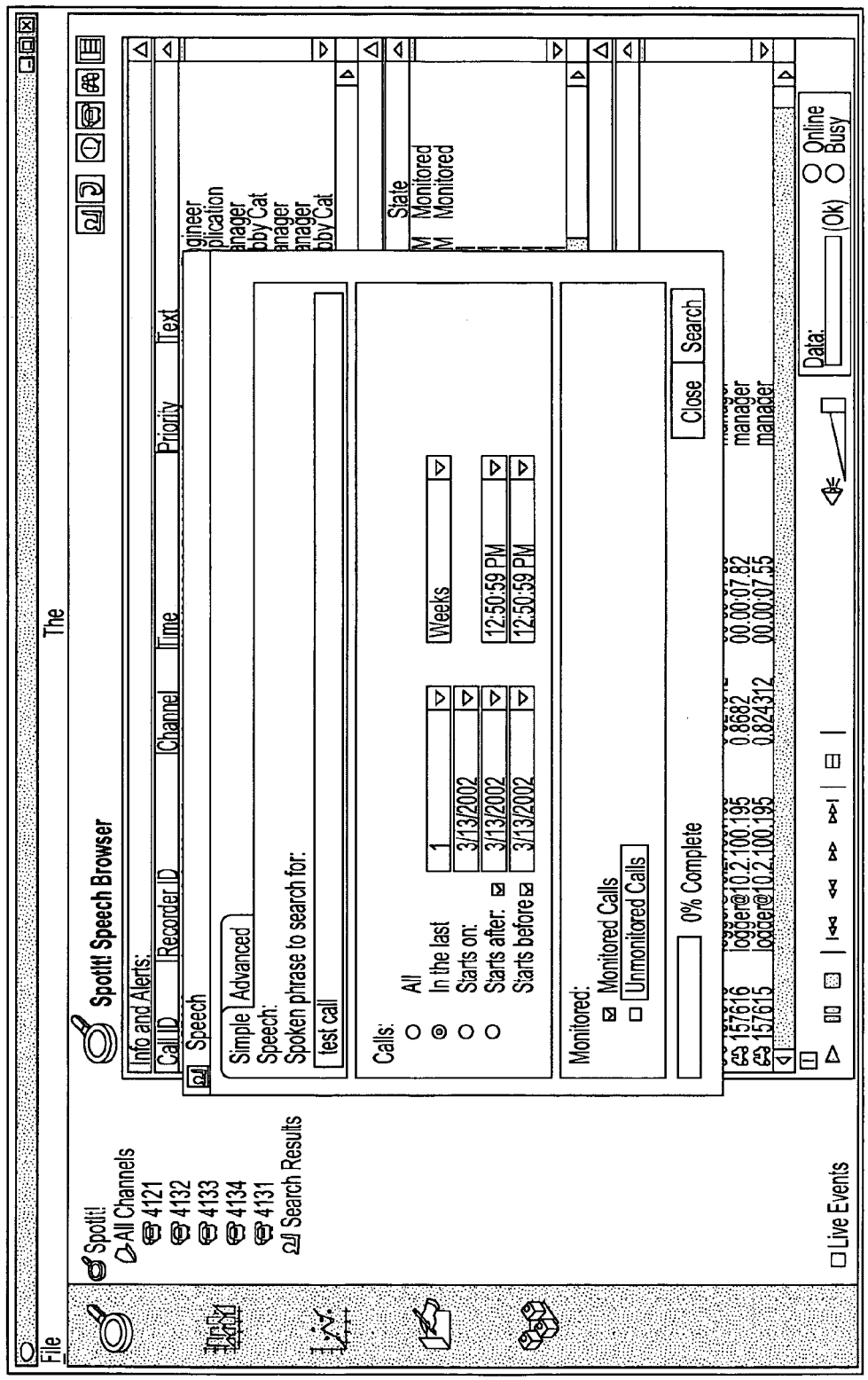
FIG. 9 is a screen shot of a workstation display depicting a speech mining browser used to implement simplified searching of audio segments.
Figure 10:
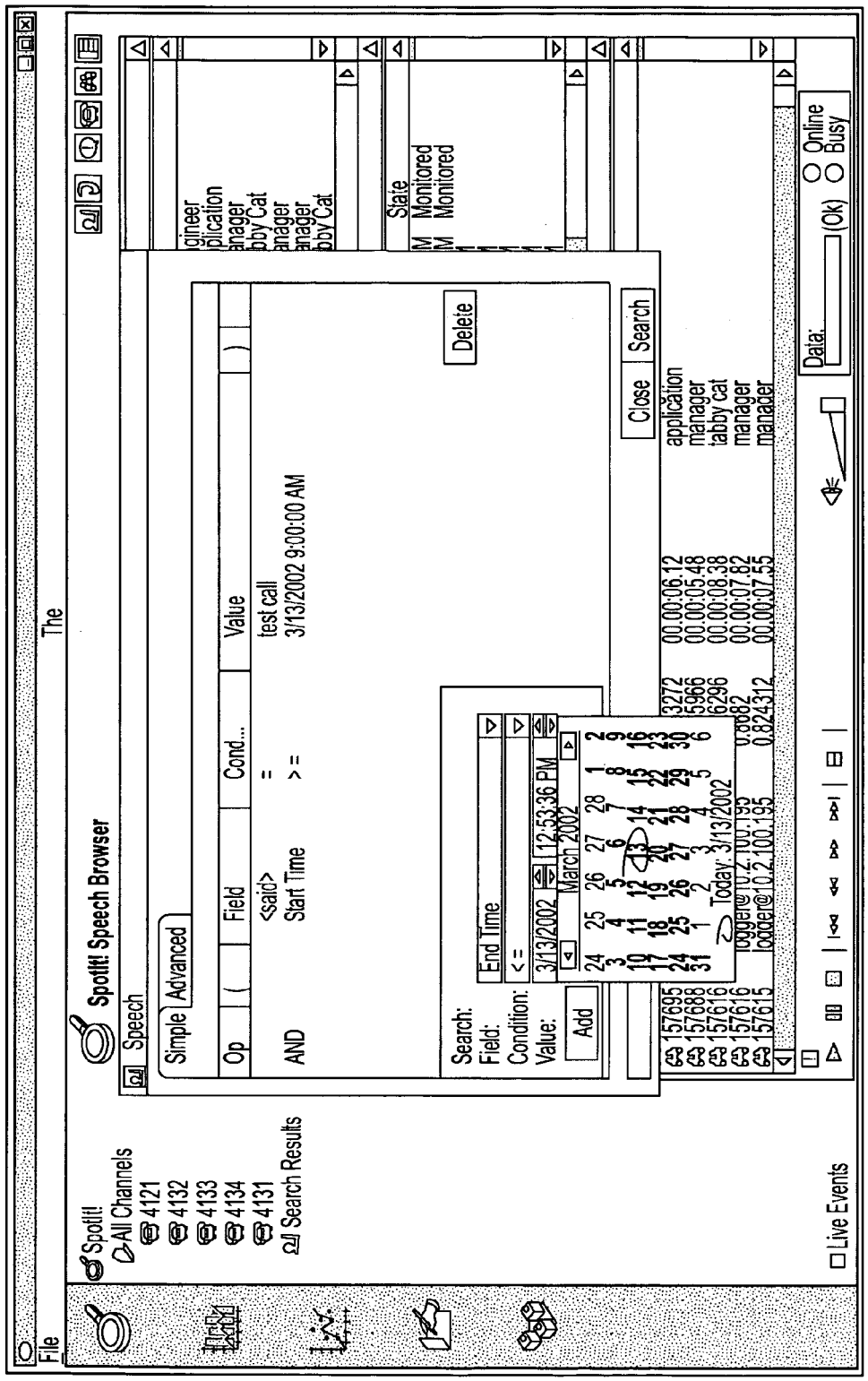
FIG. 10 is a screen shot of a workstation display depicting a speech mining browser used to implement advanced searching of audio segments.

The speech mining interface depicted in FIG. 9 can be invoked from the Speech Browser toolbar. The speech mining interface includes a Simple (FIG. 9) and Advanced (FIG. 10) dialog for selecting the records of phrases that are to be located. A speech-query and database-query can be performed together and the unified result presented to a user in the main Alerts, Call History, and Speech viewports. The audio can then be navigated in the same way that regular historical data can be navigated. FIG. 10 depicts the advance tab of the speech mining interface allowing users to build more complex queries against their data. The advanced tab allow users to create SQL and speech-queries that are integrated into a single query.

Figure 11:
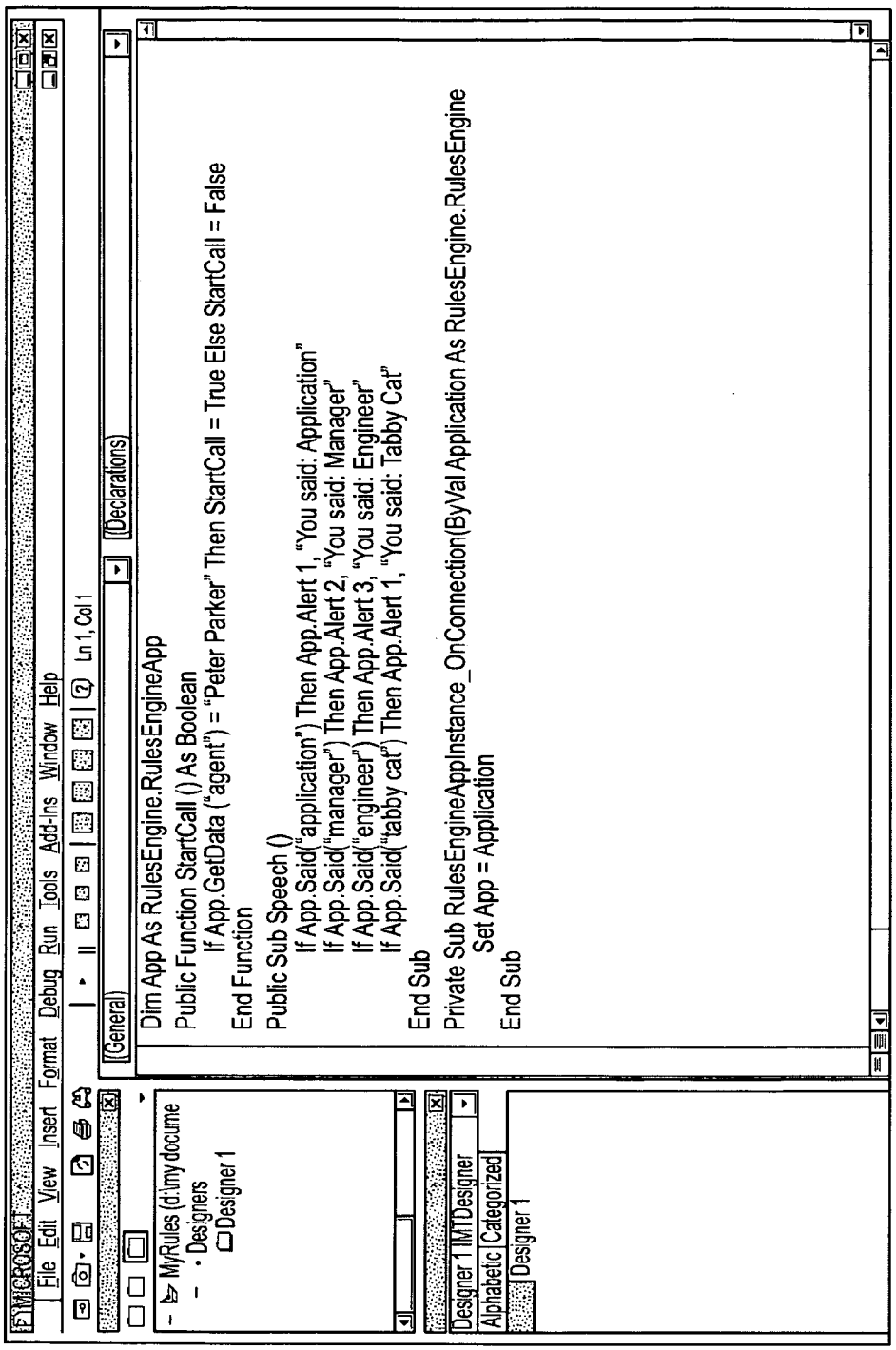
FIG. 11 is a screen shot of a workstation display depicting a rules implemented by a rules engine defining action to be taken upon receipt of a call.

Definition of rules is supported by the interface depicts in FIG. 11. The rules that the rules engine maintains determine what actions are to be taken when a call is presented to the system. In the example depicted in FIG. 11, two important functions have been implemented: StartCall( ) and Speech( ). The StartCall( ) rule determines if a call should be monitored by the system. The Speech( ) rules determined what actions to take when a piece of audio has been processed by the system and is ready to be searched. In this case, the rule displays a warning each time the user mentions the phrase "application", "manager", "engineer", or "tabby cat".

Figure 12:
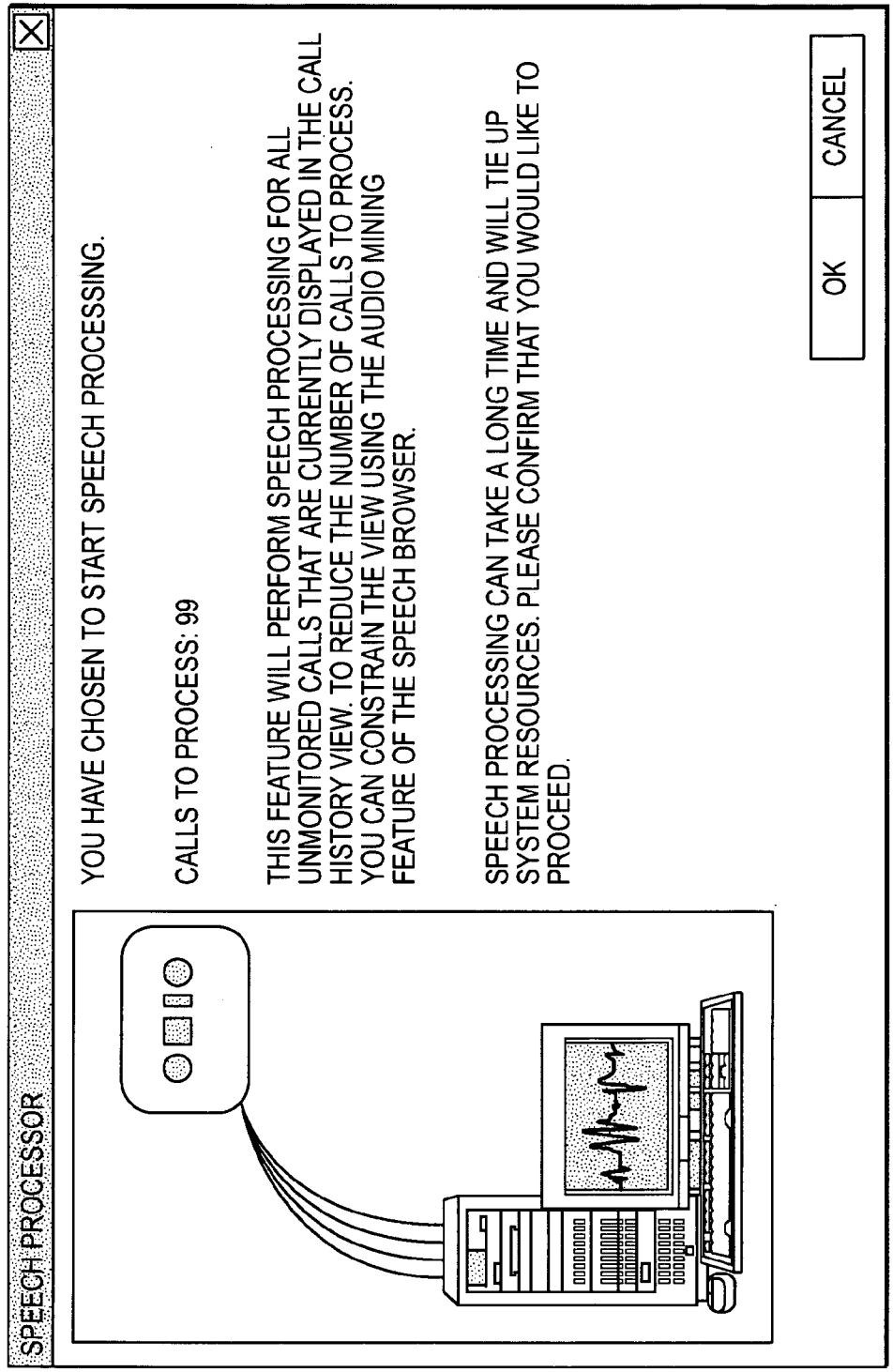
FIG. 12 is a screen shot of a workstation display depicting speech processor functions used for the batch processing of audio files.
Figure 13:
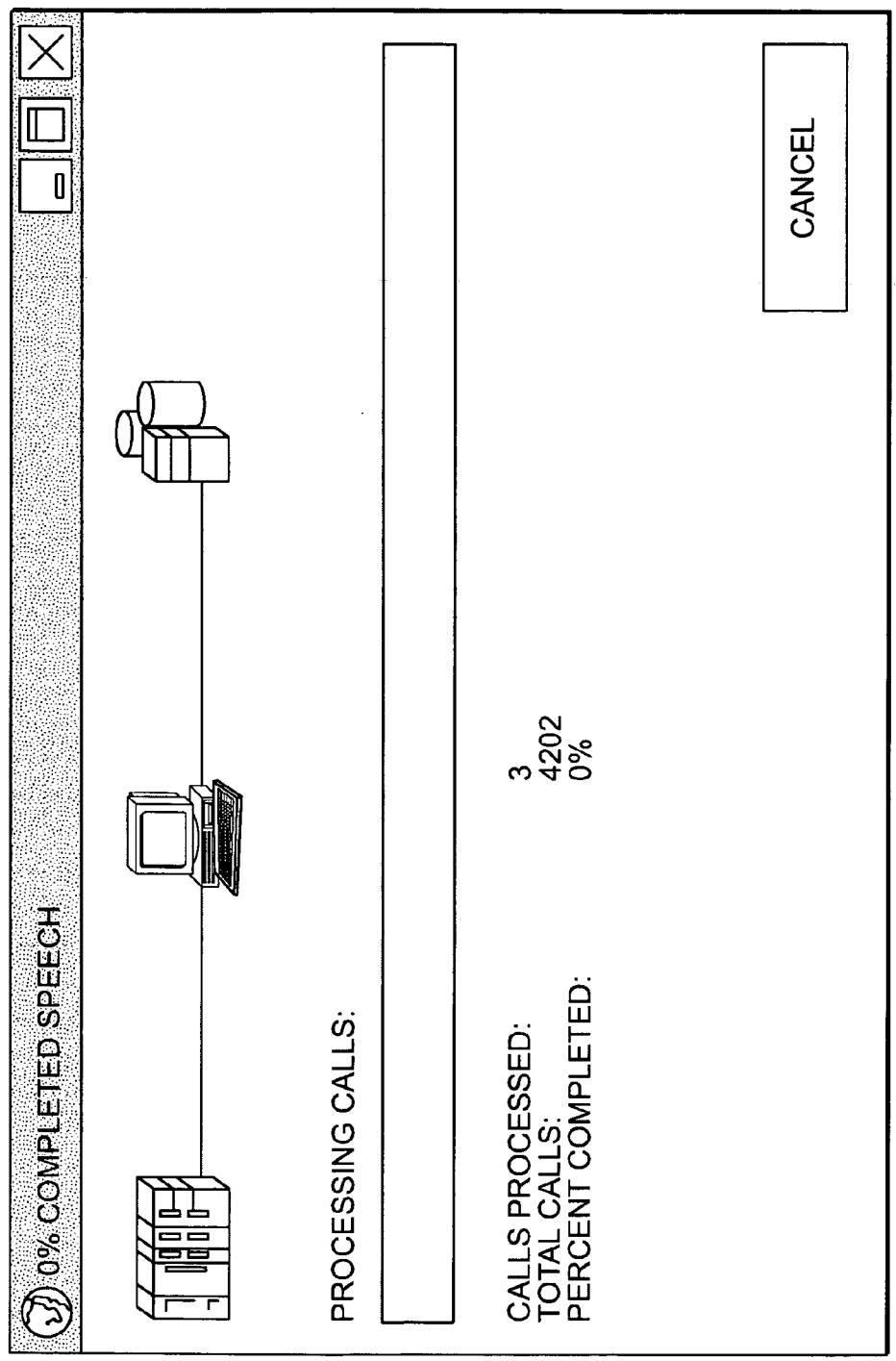
FIG. 13 is a screen shot of a workstation display depicting a progress indicator showing batch processing of audio files.

A dialog displayed upon start of the speech processor is depicted in FIG. 12. The speech processor is a feature of the speech browser that is used for monitoring calls that have not yet been processed by the system. Normally, calls are automatically processed by the system as they take place. This feature allows users to process call that were purposely not processed automatically or to process old call that existed prior to system availability. The speech processor will process the set of calls that are currently being displayed in the speech browser. A typical use of the system is to first use the speech mining feature to constrain the calls to the one that have been selected for processing, and the invoke the speech processor for the calls that have been selected. Speech processor progress may be displayed by an appropriate progress indicator as depicted in FIG. 13, showing calls as processed by the system. Once processed, the calls can be searched at high-speed. Processing may include conversion of the audio into a series of symbols representing the speech, e.g., phonetic information.

Figure 14:
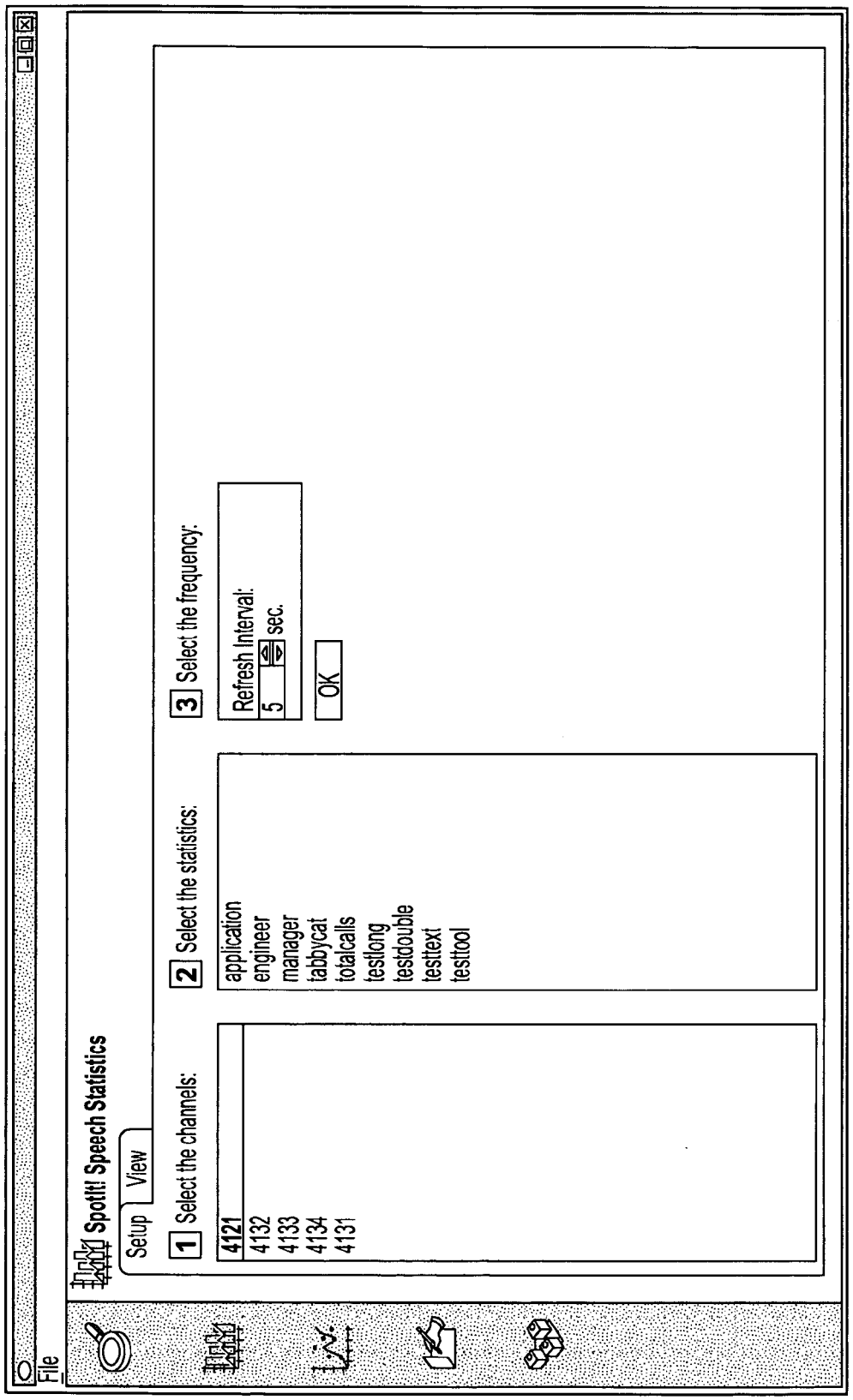
FIG. 14 is a screen shot of a workstation display depicting a speech statistics setup feature used to configure real-time graphic display of system statistics including statistics indicating the occurrence and/or non-occurrence of particular target phrases in associated audio segments and/or associated with selected categories of calls.
Figure 15:
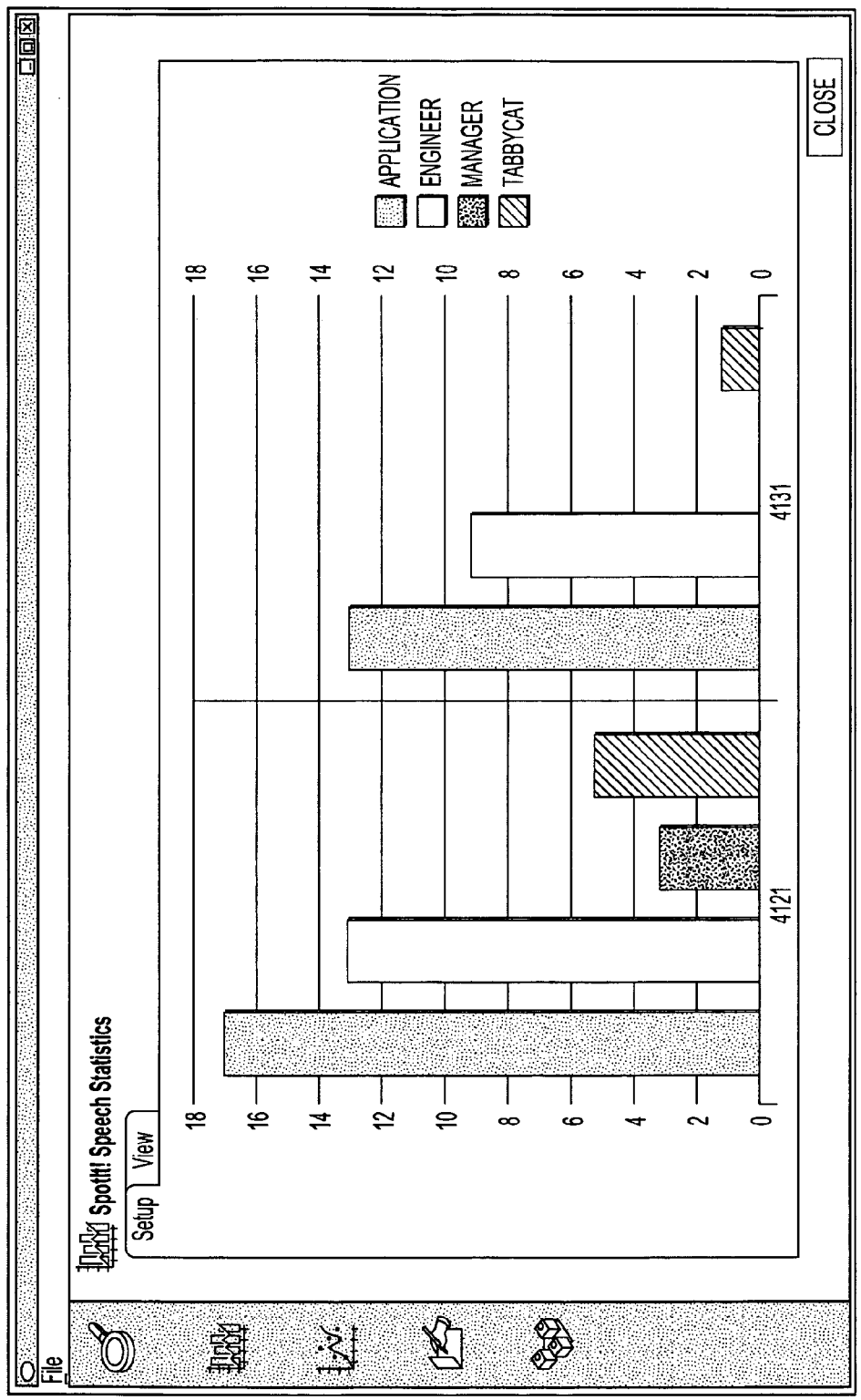
FIG. 15 is a screen shot of a workstation display depicting a sample graph of system statistics including the counts of specified target phrases identified at or associated with particular agent workstations.

FIG. 14 depicts a speech statistics setup display. The speech statistics component is used for displaying real-time graphics of statistics that are maintained by the business-rules of the system. For instance, a statistic can be created to count the number of times that a specific phrase is heard, is missing, or to calculate statistics based on any other measures. Once the speech statistics are setup, a graph such as depicts in FIG. 15 may displayed and updated in real-time. A user can watch as the graph dynamically changes over time to observe trends, not only with speech-related statistics, but with statistics than can be calculated by speech, CTI, system, and user-data.

Figure 16:
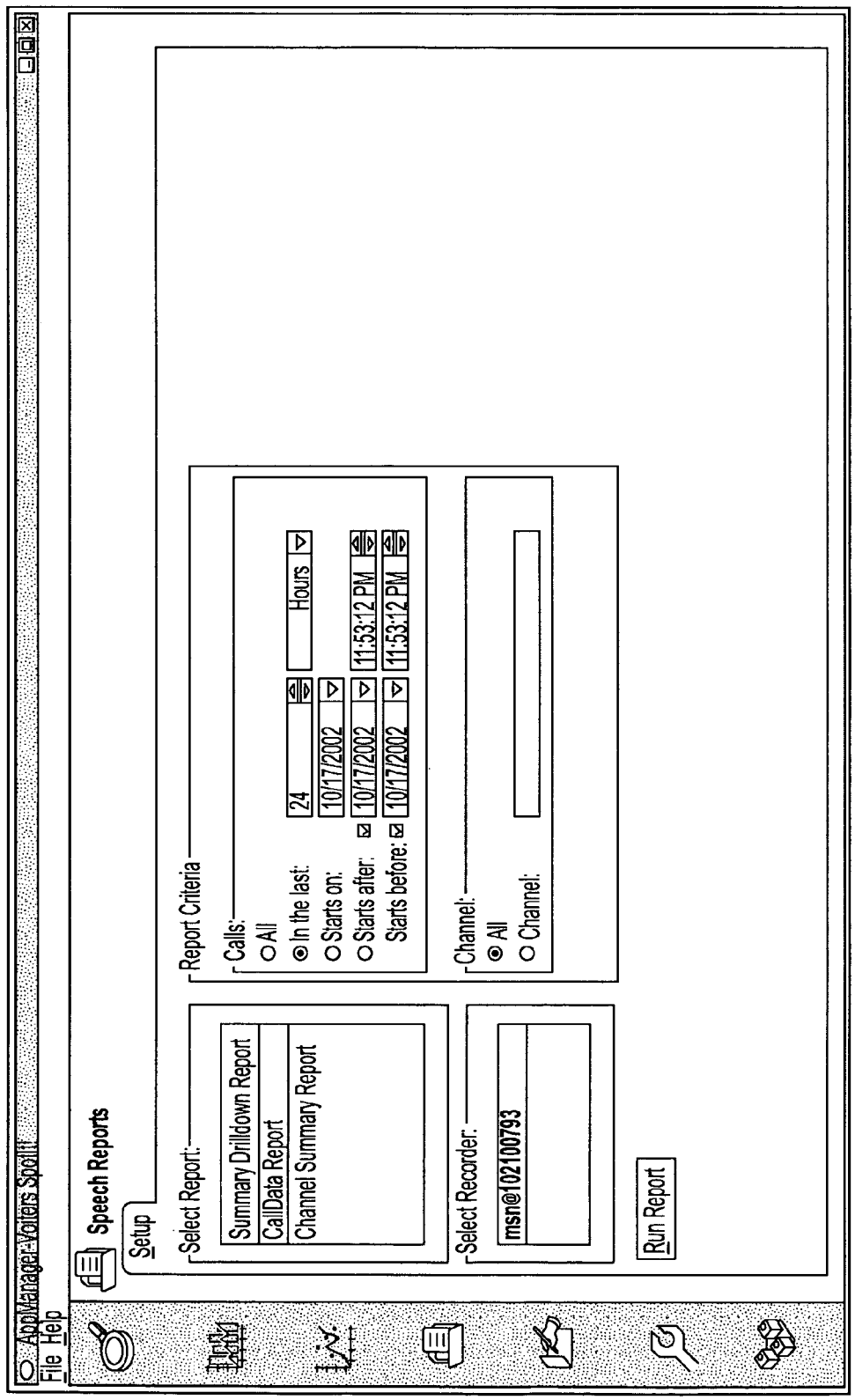
FIG. 16 is a screen shot of a workstation display depicting a speech reporting feature used to create selected reports.

Reports may be defined using, for example, the speech reports setup screen depicted in FIG. 16. The speech reports component is used to report on statistics that are maintained by the business-rules of the system. For instance, a statistics can be created to count the number of time that specific phrase is heard, found to be missing, or to calculate statistics based on any other measure. An example of a resulting report is shown in FIG. 17. Once the speech reports are setup, such a report will be displayed. A user can examine the report to observe performance trends, not only with speech-related statistics, but with statistics that can be calculated by speech, CTI, systems and user-data.

As described above, a speech mining interface according to an embodiment of the invention is invoked from a speech browser tool bar within an application such as Sertify The interface offers a simple and advanced dialog box for implementing search criteria. The tool allows for analysis of words, phrases and the ability to combine audio searches with other available data collections (such as CTI data or call-related data). In other words the interface accesses a database query tool that includes speech as data, as well as traditional data forms. The unified content is presented as an inventory of audio files that are indexed and point to the exact location in the dialogue where the target utterance resides.

Embodiment of the present invention provide the following features and functions:
  Treats voice as data;
  Reduces overhead costs and capital expenditures;
  Identifies trends by including spoken word searches;
  Offers a holistic view of contact center and agent activity from the supervisor
  Console;
  Intuitive use with little training required;
  Provides simple and advanced user interfaces;
  Enables SQL like functionality;
  Provides database integration capability;
  Enables audio content mining;
  Provides statistical and graphical reporting;
  Includes multiple search modes; and
  Provides voice logger integration.

Embodiments of the present invention may be implemented using the following standards and technology:
  Microsoft™ VBA
  Microsoft™ SQL Server
  CTI
  XML
  Client-Server Architecture
  Voice Over Internet Protocol (VOIP)

Figure 18:
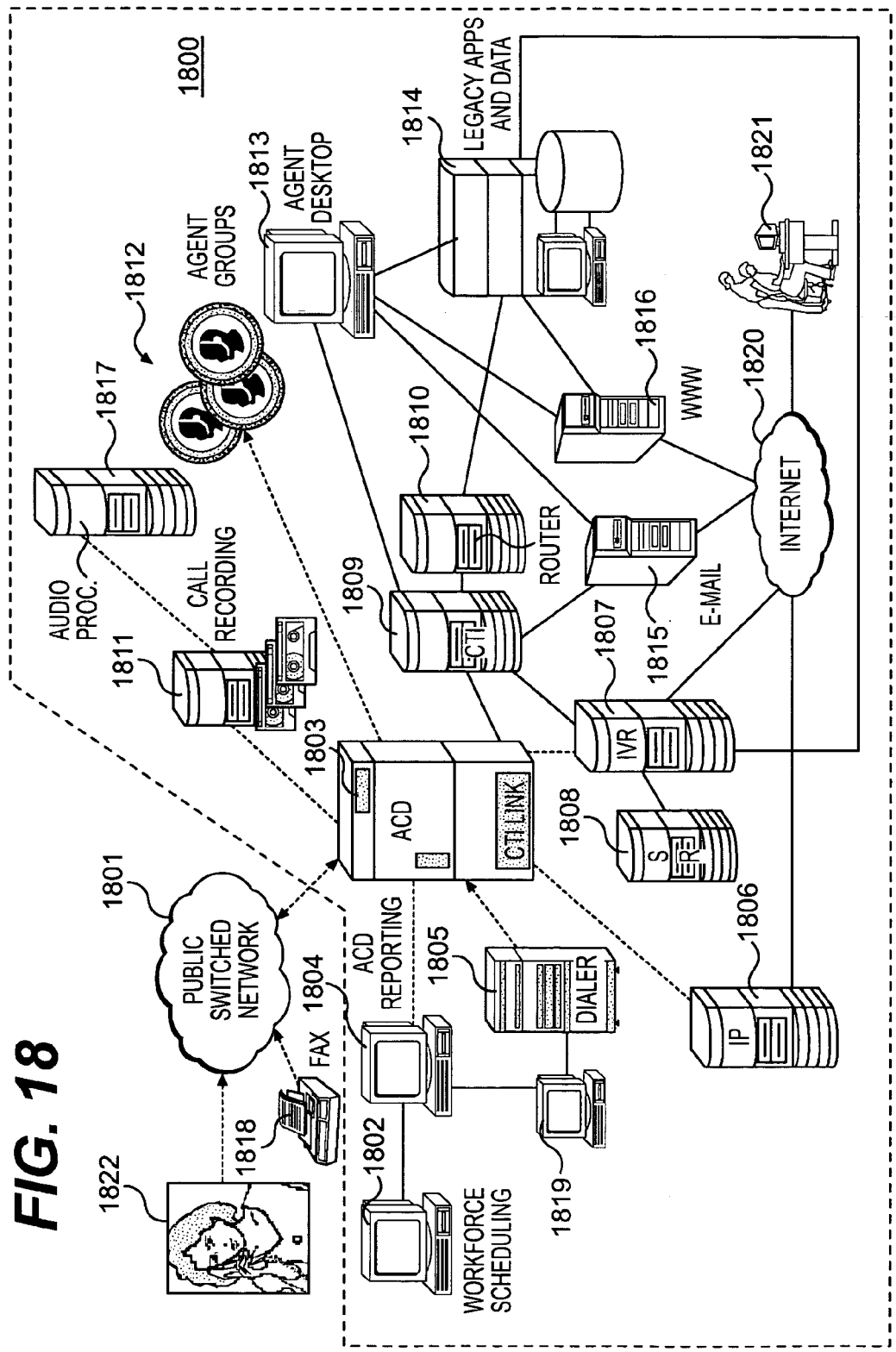
FIG. 18 is a block diagram of a contact center according to an embodiment of the invention.

Although embodiments of the present invention are applicable to a broad range of environments and applications, the examples provided above within the CTI environment are particularly well suited applications of the features and functionalities provided. Such a CTI system is shown in FIG. 18. A contact center 1800 includes:
  Audio data monitoring (this component may be incorporated into various ones of the platforms depicted as appropriate)—A system that uses speech processing and automated rules to analyze calls for quality monitoring purposes and order validation.
  Public Switched Network 1801—This is the public switched telephone network that provides a high quality voice connection between a customer and a call center.
  Workforce scheduling 1802—This is a system that uses historical call data to create a staffing forecast in order to meet a specified service level for how long it will take before a call is answered.
  ACD 1803—Automatic Call Distributor is a voice switching platform that connects to PSTN 1801 and to local extensions. Call center agents log in to ACD 1803 which associates a set of skills with each agent. When calls come in for a given skill, normally determined by the dialed number, ACD 1803 will distribute the calls to the set of agents that have the appropriate skill, normally in a round robin fashion.
  ACD reporting 1804—An add on package to the ACD 1803 providing reports about ACD 1803 activity. Skill reports normally contain items such as calls handled, calls abandoned, and wait times. Agent reports contain agent specific information such as time on the system, calls handled, avg talk time, longest talk time, etc.
  Dialer 1805—A system for predictive dialing. In predictive dialing calls are launched on behalf of a group of agents. Because not all calls may result in a live connect, the number of calls dialed is normally higher than the number of available agents. This system enhances productivity because the system only connects live answers and agents do not have to dial calls or listen to call progress such as ringing or busy signals.
  IP 1806—This is an IP gateway so that VOIP calls can be handled by ACD 1803 in the same fashion as calls that arrive over PSTN 1801
  IVR 1807—Interactive Voice Response (aka VRU or voice response unit)—a system that allows automated call handling. The system can accept touch tone input, access data, and using text to speech, speak the data to the caller. A common example is a bank application where you can call and get your balance.
  SR 1808—Speech Recognition is an add on to IVR 1807 that allows IVR 1807 to accept voice input in addition to touch tone input.
  CTI 1809—A computer telephony interface middleware server that interfaces to the proprietary CTI interface of ACD 1803 and allows CTI clients to receive events and exert control over contacts.
  Router 1810—An add on application to the CTI middleware for intelligent call routing. When a call arrives, CTI data from the call is used to access information and route the call appropriately, for example putting a high value customer at the head of the queue.
  Call Recording 1811—A system that makes digital recordings of calls within the contact center.
  Agent Groups 1812—The human employees of the contact center that handle voice calls.
  Agent Desktop 1813—A computer interface that runs programs which support the agent interactions with callers.
  Legacy Apps and Data 1814—Computer systems that contain data about the callers and the business. Used for routing decisions and to provide information to the callers.
  Email 1815—A server for processing email messages. Properly skilled agents can handle email interactions as well as voice interactions.
  WWW 1816—A web server that can host self service applications. Self service web applications can be used to off load work from contact center agents by providing information.
  Audio Processor 1817—An audio server according to an embodiment of the invention, providing for the processing of audio from Call Recording 1811, generation of searchable audio segments, and supporting data mining.

Figure 19:
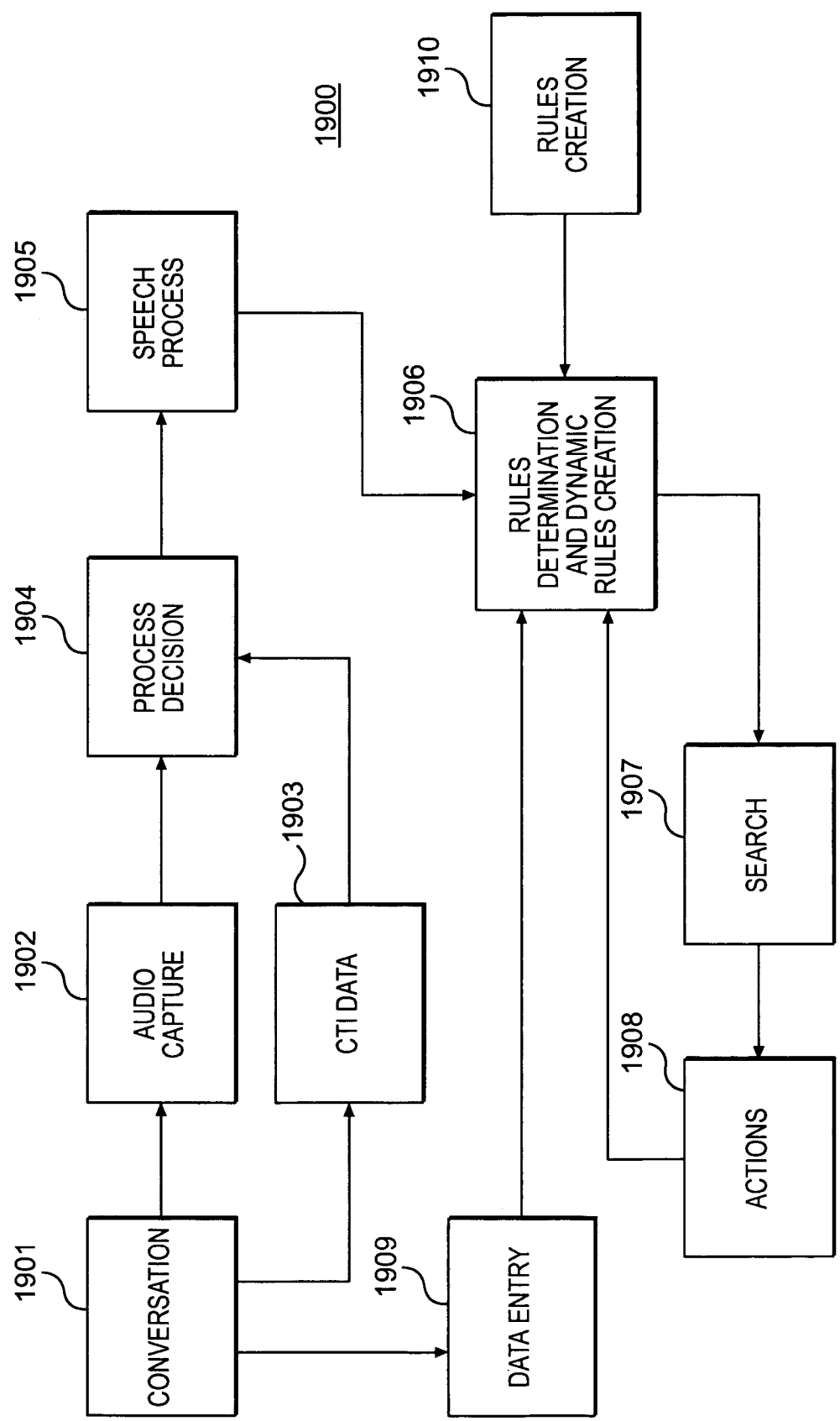
FIG. 19 is a flow diagram depicting a method of collecting, processing, organizing, and searching speech segments according to an embodiment of the invention.

A method for capturing and searching audio associated with respective calls is depicted in the flow chart of FIG. 19. As shown therein, a telephone conversation occurs at step 1901. This conversation may be carried over the public switched telephone network, or it may be over a data network using Voice over IP technology, or it may be a hybrid where some of the voice transmission is over the PSTN and some uses VOIP.

At step 1902, audio is captured from the conversation of step 1901 and a digital representation is made and stored within a computer system. If the recording is done through a digital PBX or a VOIP switch, then the capture may be accomplished through a direct data stream. Another option is an analog tap of a phone, in which case the voice is digitized as part of the process of making the recording. It is common for devices which record audio to compress the digital representation to conserve computer storage.

Step 1903 includes functionality provided by a CTI middleware product that can connect to a digital PBX or ACD and receive information associated with a call from the digital PBX or ACD. Although not a required component, it provides additional functionality. Examples of information that can be associated with a call are the callers number (CLID/ANI) the number dialed (DNIS) the local extension that received the call, and in the case of an ACD, the agent id of the person that handled the call.

When a new audio segment is available a decision is made at step 1904 whether that audio should be processed. If there is no CTI data some information may be provided by the recording device at 1902 such as which phone extension or trunk provided the audio. If the optional CTI interface is included, there is additional data as noted in connection with 1903. Using all available data logic is executed at 1904 and a decision is made about the audio segment. If the decision is to process the audio, then a reference to the audio and it's associated data is put in a queue for speech processing.

Speech processing 1905 is alerted when a reference to an audio segment is added to the queue, it invokes the speech engine to pre process the audio into an intermediate format. The intermediate format is a representation of the audio that is optimized for rapid searching. Some representations that are suitable for rapid searches are a statistical model of the phonemes or a text representation of the contents of the audio. Once the intermediate format is created, then rules determination is executed at 1906.

Data entry occurs at 1909. In a call center environment agents often enter data about a call into a computer system during the call. An example could be the length of a subscription. This is also not a required element. However, if data is collected in association with a call, then this data is also associated with an audio file and can be used to create dynamic rules at 1906.

A process for offline rules creation is provided at 1910. Such rules can be static or dynamic. Static rules are fully defined at rule creation time and do not involve any data elements that are only known at run time. An example of a static rule would be "generate an alert if at any time on the call there is at least a 70% confidence that the audio contains Take your business elsewhere". Dynamic rules contain some template information and the rule can only be fully formed when the audio and it's associated data is known. An example of a dynamic rule would be "Generate an alert if the audio does not contain "Thank you for calling my name is {agentid} how may I help you" where the name of the agent that is handling the call is substituted for {agentid}. A set of individual rules are then gathered into a rule set, and further logic is defined for a rule set to control when that set is applied. This logic can use any information that is known about an audio segment. According to a preferred embodiment, rules may contain some phrase that is to be used to search the audio, and this phrase is entered by typing into an interface. It should be noted that other methods of entering phrases, such as speaking them into the system may be employed in the future.

The logic processing according to 1906 is executed when an intermediate file is created. Rules determination considers the information known about the audio and determines which rules sets to apply to the audio. More than one rule set may be applied to a single instance of audio. If any of the applicable rules sets contain dynamic rules, then, at 1906, the data substitutions are made to create a rule applicable to the audio segment. There is a loop between steps 1906, 1907 and 1908. Since rules execution contains branching logic, the rules are executed in step 1906, but as part of that execution searches may be performed and corresponding actions may be initiated (step 1908).). A speech queue is used to allow search requests (step 1907) to be performed by any available speech worker At step 1907 any searches required to support the rules execution are performed. Searches are performed against the intermediate file created at step 1905. If the intermediate format is a statistical model of the phonemes, then the search string must be represented as a set of probable phonemic representations of each word in the search string. If the search string was entered as text, a mapping of the text to a plurality of possible phoneme strings is performed in this step. (Note that a single text phrase may map to more than one symbolic representation.) If the intermediate file is text, then no format conversion is required. Once the intermediate file and search string are in a common format, a pattern match is performed, and a confidence is returned that the search pattern exists within the processed audio.

When a search is performed for a specific phrase by a speech process, a list of result hypotheses are returned from the speech recognition engine. Each result in the list is given an associated "confidence score" that indicates the probability that the result is, in fact, a correct result. The distribution of confidence scores is typically not uniform across all search phrases and therefore a "confidence threshold" value is determined for each search phrase that indicates what the lowest acceptable confidence threshold for a search result may be in order to be considered by the system to be a correct result.

The process of threshold determination is performed by first determining a set of calls that represent a test or training set. A specific phrase is selected, a search is performed, and the resulting list of result hypotheses will be returned. A human listener is then used to listen to the list of result hypotheses and to determine at what point in the result distribution that the confidence scores fail to be accurate. As the listener inspects search results, they are queued to the exact point in each call that the candidate result was located and allows the listener to only listen to a small portion of each call in order to determine the appropriate threshold.

As part of the rules processing actions can be initiated, such as creating an alert or incrementing a statistic. According to one embodiment, alerts and statistics may be stored in a relational database.

It should now be appreciated that the present invention provides advantageous methods and apparatus for audio data analysis and data mining using speech recognition.

In this disclosure there is shown and described only the preferred embodiments of the invention and but a few examples of its versatility. It is to be understood that the invention is capable of use in various other combinations and environments and is capable of changes or modifications within the scope of the inventive concept as expressed herein. For example, while embodiments of the invention have been described in connection with contact centers, CTI and other telephony based application, embodiments of the invention are equally applicable to other environments wherein speech, audio, and other real-time information may be collected, stored and processed for rapid searching. Thus, although the invention has been described in connection with various illustrated embodiments, numerous modifications and adaptations may be made thereto without departing from the spirit and scope of the invention as set forth in the claims. Furthermore, it should be noted and understood that all publications, patents and patent applications mentioned in this specification are indicative of the level of skill in the art to which the invention pertains. All publications, patents and patent applications are herein incorporated by reference to the same extent as if each individual publication, patent or patent application was specifically and individually indicated to be incorporated by reference in its entirety.

What is claimed is:

1. A method of analyzing audio data, comprising the step of:
   processing an audio segment into a format suitable for rapid searching;
   determining, in response to data associated with said audio segment, an appropriate set of business rules to apply to said audio segment; and
   searching said audio segment in accordance with said appropriate set of business rules.

2. The method according to claim 1 further comprising a step of referencing said audio segment wherein said audio segment has been previously stored in an electronic media.

3. The method according to claim 1 further comprising a step of recording said audio segment.

4. The method according to claim 1 wherein said step of processing includes a step of processing said audio segment into a format suitable for rapid phonetic searching.

5. The method according to claim 1 wherein said step of processing includes a step of identifying symbols, corresponding to discrete portions of said audio segment.

6. The method according to claim 5 wherein said symbols represent respective phonemes of a set of phonemes characteristic of speech.

7. The method according to claim 1 wherein said step of searching includes the steps of:
   attempting to find a match within said audio segment of a target phrase; and
   in response, determining whether said target phrase is present within said audio segment at or above a specified confidence level.

8. The method according to claim 7 further comprising a step of triggering an event in response to said step of determining whether said target phrase is present within said audio segment.

9. The method according to claim 1 further comprising a step of triggering an event as a result of said searching step resulting in matching a given phrase at or above a specified confidence level.

10. The method according to claim 1 further comprising a step of triggering an event as a result of said searching step resulting in not finding a match for a given phrase at or above a specified confidence level.

11. The method according to claim 1 further comprising a step of incrementing a statistical parameter as a result of said searching step resulting in matching a given phrase at or above a specified confidence level.

12. The method according to claim 1 further comprising a step of incrementing a statistical parameter as a result of said searching step resulting in not finding a match for a given phrase at or above a specified confidence level.

13. The method according to claim 1 wherein said step of searching includes a step of searching said audio segment for a combination of a plurality of phrases.

14. The method according to claim 13 wherein said step of searching said audio segment for said combination of phrases includes a specified order of said phrases within said audio segment.

15. The method according to claim 14 further comprising the step of triggering an event in response to finding a match for said combination of phrases in said specified order in said audio segment.

16. The method according to claim 14 further comprising the step of triggering an event in response to not finding a match for said combination of phrases in said specified order in said audio segment.

17. The method according to claim 14 further comprising the step of incrementing a statistical value in response to finding a match for said combination of phrases in said specified order in said audio segment.

18. The method according to claim 14 further comprising the step of incrementing a statistical value in response to not finding a match for said combination of phrases in said specified order in said audio segment.

19. The method according to claim 13 wherein said step of searching said audio segment for said combination of phrases includes a specified temporal relationship of said phrases within said audio segment.

20. The method according to claim 19 wherein said temporal relationship comprises an occurrence of said phrases within a specified time period within said audio segment.

21. The method according to claim 1 wherein said step of searching includes a step of searching said audio segment for a target phrase occurrence within a specified time period within said audio segment.

22. The method according to claim 1 further comprising the steps of:
   analyzing Computer Telephony Integration (CTI) data associated with said audio segment; and
   providing an indication of satisfaction of a criteria in response to said steps of searching and analyzing.

23. The method according to claim 22 wherein said step of analyzing said CTI data includes a step of analyzing CTI data selected from the set consisting of (i) called number (dialed number identification service or "DNIS") and (ii) calling number (Automatic Number Identification or "ANI").

24. The method according to claim 1 further comprising a step of performing order validation.

25. The method according to claim 24 wherein said step of performing order validation includes the step of comparing a parameter of an order associated with said audio segment with a content of said audio segment resulting from said searching step.

26. The method according to claim 1 wherein said step of searching includes a step of searching for a target phrase, said method further comprising a step of performing order validation including determining whether an order associated with said audio segment is consistent with a result of said step of searching for said target phrase.

27. The method according to claim 26 further comprising a step of entering data for said order wherein said step of performing order validation includes validating whether said data is reflected within said audio segment.

28. The method according to claim 1 wherein said step of searching includes searching for a target utterance selected in response to said data related to said audio segment.

29. A method of processing audio data, comprising the step of:
importing call data;
selectively, responsive to said call data, analyzing an audio segment associated with said call data, said step of analyzing including
processing said audio segment into a format suitable for rapid searching;
determining, in response to said call data, an appropriate set of business rules to apply to said audio segment; and
searching said audio segment in accordance with said appropriate set of business rules.

30. The method according to claim 29 wherein said call data includes Computer Telephony Integration data selected from the group consisting of (i) called number (dialed number identification service or "DNIS") and (ii) calling number (Automatic Number Identification or "ANI").

31. The method according to claim 29 further comprising the steps of:
receiving call related event data associated with a telephone call, said call related event data related to said audio segment;
extracting said audio segment from said telephone call; and
correlating said data related to said audio segment to said audio segment.

32. The method according to claim 31 wherein said data related to said audio segment includes metadata.

33. The method according to claim 31 wherein said call related event data includes information selected from the group consisting of (i) time/day of call; (ii) telephone number of a client party; (iii) extension number of an agent; and (iv) trunk identification.

34. The method according to claim 31 wherein said call related event data includes data selected from the group consisting of (i) dialed number identification service (DNIS); (ii) Automatic Number Identification/Calling Line Identification (ANT/CLID); (iii) collected digital; and (iv) agent identification.

35. A system for analyzing audio data comprising:
an audio processor operable to process an audio segment into a format suitable for rapid searching;
logic responsive to data associated with said audio segment to determine an appropriate set of business rules to apply to said audio segment; and
a search engine operable to search said audio segment in accordance with said appropriate set of business rules.

36. The system according to claim 35 further comprising an electronic media having stored therein said audio segment and circuitry for retrieving said audio segment from said memory and providing said audio segment to said audio processor.

37. The system according to claim 35 further comprising an audio recorder operable to store said audio segment.

38. The system according to claim 35 wherein said audio processor is operable to process said audio segment into a format suitable for rapid phonetic searching and said search engine is operable to search said audio segment for phonetic information.

39. The system according to claim 35 wherein said search engine is further operable to identify symbols corresponding to discrete portions of said audio segment.

40. The system according to claim 39 wherein said symbols represent respective phonemes of a set of phonemes characteristic of speech.

41. The system according to claim 39 wherein said search engine is further operable to:
attempt to find a match within said audio segment of a target phrase; and
in response, determine whether said target phrase is present within said audio segment at or above a specified confidence level.

42. The system according to claim 41 further comprising logic operable to trigger an event in response to a presence or absence of said target phrase within said audio segment at or above said specified confidence level.

43. The system according to claim 35 further comprising logic operable to trigger an event in response to said search engine finding a target phrase within said audio segment at or above a specified confidence level.

44. The system according to claim 35 further comprising logic operable to trigger an event in response to said search engine not finding a target phrase within said audio segment at or above a specified confidence level.

45. The system according to claim 35 further logic operable to increment a statistical parameter as a result of said search engine finding a target phrase within said audio segment at or above a specified confidence level.

46. The system according to claim 35 further logic operable to increment a statistical parameter as a result of said search engine not finding a target phrase within said audio segment at or above a specified confidence level.

47. The system according to claim 35 wherein said search engine is further operable to search said audio segment for a combination of a plurality of phrases.

48. The system according to claim 47 wherein said search engine is further operable to search said audio segment for an occurrence of said combination of phrases in a specified order.

49. The system according to claim 48 further comprising logic operable to trigger an event in response to said search engine finding a match for said combination of phrases in said specified order in said audio segment.

50. The system according to claim 48 further comprising logic operable to trigger an event in response to said search engine not finding a match for said combination of phrases in said specified order in said audio segment.

51. The system according to claim 48 further comprising logic operable to increment a statistical value in response to said search engine finding a match for said combination of phrases in said specified order in said audio segment.

52. The system according to claim 48 further comprising logic operable to increment a statistical value in response to said search engine not finding a match for said combination of phrases in said specified order in said audio segment.

53. The system according to claim 48 wherein said search engine is further operable to search said audio segment for an occurrence of said combination of phrases in a specified temporal relationship within said audio segment.

54. The system according to claim 53 wherein said temporal relationship comprises an occurrence of said phrases within a specified time period within said audio segment.

55. The system according to claim 35 wherein said search engine is operable to search said audio segment for a target phrase occurrence within a specified time period within said audio segment.

56. The system according to claim 35 further comprising logic operable to analyze Computer Telephony Integration (CTI) data associated with said audio segment and provide an indication of satisfaction of a criteria in response to said CTI data and an output from said search engine.

57. The system according to claim 56 wherein said logic operable to analyze said CTI data is responsive to CTI data selected from the set consisting of (i) called number (dialed number identification service or "DNIS") and (ii) calling number (Automatic Number Identification or "ANI").

58. The system according to claim 35 further comprising logic operable to perform order validation.

59. The system according to claim 58 wherein said logic operable to perform order validation is operable to compare a parameter of an order associated with said audio segment with a content of said audio segment identified by said search engine.

60. The system according to claim 35 wherein said search engine is further operable to search for a target phrase, said system further comprising logic operable to perform order validation including determining whether an order associated with said audio segment is consistent with a result of said search engine searching for said target phrase.

61. The system according to claim 60 further comprising a terminal operable for the entry of data for said order wherein said logic operable to perform said order validation is operable to validate whether said data is reflected within said audio segment.

62. The system according to claim 35 further comprising:
circuitry for receiving a call related event data associated with a telephone call, said call related event data related to said audio segment;
logic for extracting said audio segment from said telephone call; and
logic for correlating said data to said audio segment.

63. The system according to claim 62 wherein said data related to said audio segment includes metadata including call data augmenting an information content directly extractable from said audio segment.

64. The system according to claim 35 further operable for:
receiving a call related event data associated with a telephone call, said call related event data related to said audio segment;
extracting said audio segment from said telephone call; and
correlating said data to said audio segment.

65. The system according to claim 64 wherein said call related event data includes information selected from the group consisting of (i) time/day of call; (ii) telephone number of a client party; (iii) extension number of an agent; and (iv) trunk identification.

66. The system according to claim 64 wherein said call related event data includes data selected from the group consisting of (i) dialed number identification service (DNIS); (ii) Automatic Number Identification/Calling Line Identification (ANI/CLID); (iii) collected digital; and (iv) agent identification.

67. The system according to claim 35 wherein said step of search engine is further operable to search for a target utterance selected in response to said data related to said audio segment.

68. A system of processing audio data comprising:
telephone equipment connected to receive call data;
an audio processor responsive to said call data for selectively analyzing an audio segment associated with said call data, said audio processor operable to
process said audio segment into a format suitable for rapid searching;
determine, in response to said call data, an appropriate set of business rules to apply to said audio segment; and
search said audio segment in accordance with said appropriate set of business rules.

69. The system according to claim 68 wherein said call data includes Computer Telephony Integration data selected from the group consisting of (i) called number (dialed number identification service or "DNIS") and (ii) calling number (Automatic Number Identification or "ANI").

70. A method for monitoring audio data, comprising:
recording an audio segment;
setting business rules, in response to metadata associated with said audio segment, for searching for spoken words or phrases in said audio segment using speech recognition technology;
searching said audio segment in accordance with said business rules; and
providing a report based on said search.

* * * * *